(12) United States Patent
Sugita et al.

(10) Patent No.: US 7,272,290 B2
(45) Date of Patent: Sep. 18, 2007

(54) METHOD FOR FABRICATION OF OPTICAL ELEMENT, AND OPTICAL ELEMENT HAVING THREE-DIMENSIONAL LAMINATED STRUCTURE

(75) Inventors: Mitsuro Sugita, Tokyo (JP); Takao Yonehara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/571,696

(22) PCT Filed: Nov. 8, 2004

(86) PCT No.: PCT/JP2004/016901

§ 371 (c)(1),
(2), (4) Date: Mar. 13, 2006

(87) PCT Pub. No.: WO2005/045492

PCT Pub. Date: May 19, 2005

(65) Prior Publication Data
US 2007/0031108 A1 Feb. 8, 2007

(30) Foreign Application Priority Data
Nov. 7, 2003 (JP) ............................. 2003-377638
Nov. 1, 2004 (JP) ............................. 2004-317579

(51) Int. Cl.
*G02B 6/10* (2006.01)

(52) U.S. Cl. ...................... 385/129; 385/130; 385/131; 385/132

(58) Field of Classification Search ......... 385/129–132
See application file for complete search history.

(56) References Cited

U.S. PATENT DOCUMENTS 5,187,461 A 2/1993 Brommer et al. ........ 333/219.1

(Continued)

FOREIGN PATENT DOCUMENTS

DE   100 14 723 A1   9/2001

(Continued)

OTHER PUBLICATIONS

K. Wada et al., "A New Approach of Photonic Bandgap Formation—Wafer Bonding and Delamination Technique," *Extended Abstracts, International Conference on Solid State Devices and Materials*, pp. 382-383 (1998).

(Continued)

*Primary Examiner*—Frank G. Font
*Assistant Examiner*—Jerry Martin Blevins
(74) *Attorney, Agent, or Firm*—Fitzpatrick, Cella, Harper & Scinto

(57) ABSTRACT

A method for production of an optical element includes preparing a first member having formed on the surface of a first substrate 101 a first layer 103 by at least one of epitaxial growth and pore-making (micropore-making) and a second member having a porous layer for layer separation formed on a second substrate 104 and having formed thereon a second layer by at least one of epitaxial growth and pore-making (micropore-making), bonding the first layer 103 and the second layer, separating the second substrate 104 and the second layer of the second member from each other at the porous layer for layer separation in the second member, to form a laminated structure on the first substrate 101, forming a refraction index distribution pattern produced by a difference in refraction index in the plane of at least one of the first layer 103 and the second layer.

2 Claims, 21 Drawing Sheets

U.S. PATENT DOCUMENTS

| | | | |
|---|---|---|---|
| 5,335,240 A | 8/1994 | Ho et al. | |
| 5,389,943 A | 2/1995 | Brommer et al. | 343/909 |
| 5,471,180 A | 11/1995 | Brommer et al. | 333/202 |
| 5,987,208 A | 11/1999 | Grüning et al. | 385/146 |
| 5,999,308 A * | 12/1999 | Nelson et al. | 359/321 |
| 6,143,628 A * | 11/2000 | Sato et al. | 438/455 |
| 6,171,512 B1 | 1/2001 | Sakaguchi et al. | |
| 6,238,586 B1 | 5/2001 | Sakaguchi et al. | |
| 6,254,794 B1 | 7/2001 | Sakaguchi et al. | |
| 6,326,279 B1 | 12/2001 | Kakizaki et al. | 438/406 |
| 6,810,056 B1 * | 10/2004 | Lipson et al. | 372/46.01 |
| 6,852,203 B1 | 2/2005 | Kawakami et al. | |

FOREIGN PATENT DOCUMENTS

| | | | |
|---|---|---|---|
| JP | 2000-349267 | 12/2000 | |
| JP | 2001-160654 | 6/2001 | |
| JP | 2003-107265 | 4/2003 | |
| JP | 2003107265 A * | 4/2003 | 385/14 |
| WO | 98/44368 A1 | 10/1998 | |

OTHER PUBLICATIONS

Noritsugu Yamamoto et al., "Development of a Period of Three-Dimensional Photonic Crystal Operating at Optical Wavelength Region," *10th Intern. Conf. On Indium Phosphide and Related Materials*, pp. 809-812 (1998).

S. Kawatami, "Fabrication of Submicrometre 3D Periodic Structures Composed of Si/SiO2," 33(14) Electronic Letters 1260-61 (Jul. 1997).

Eli Yablonovitch, "Inhibited Spontaneous Emission in Solid-State Physics and Electronics," 58(20) Physical Rev. Lett. 2059-62 (1987).

Photonic Crystals—Application, Technology and Physics, pp. 128-141, 157-168, 229-240 (CMS Press, 2002).

\* cited by examiner

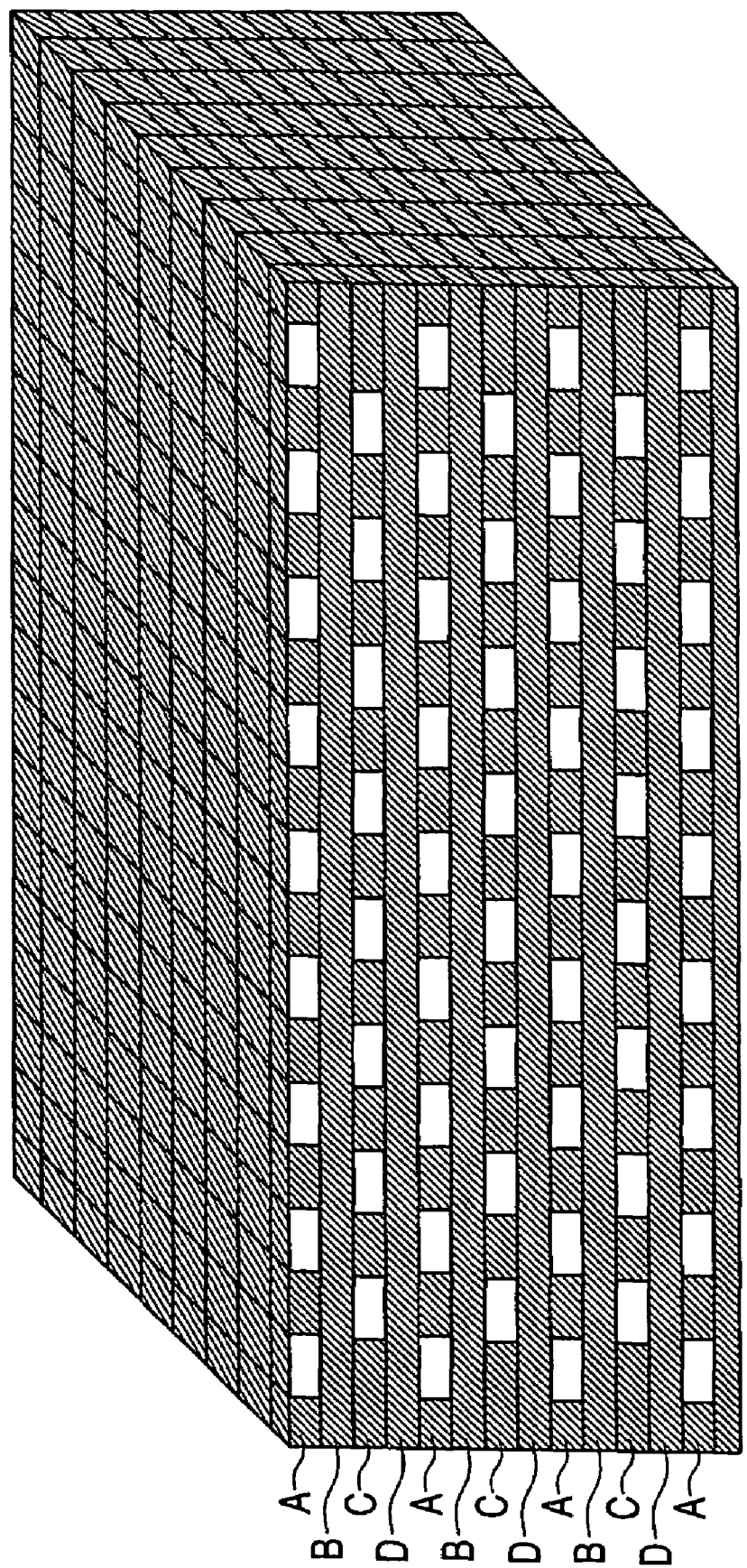

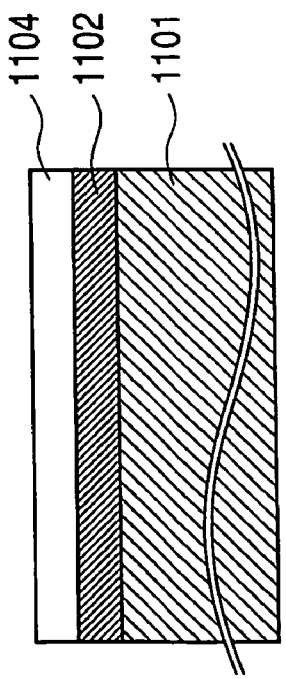
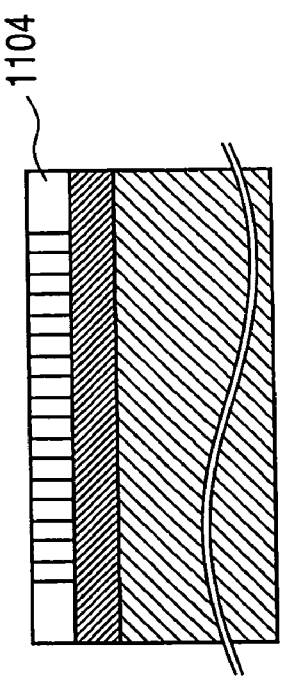
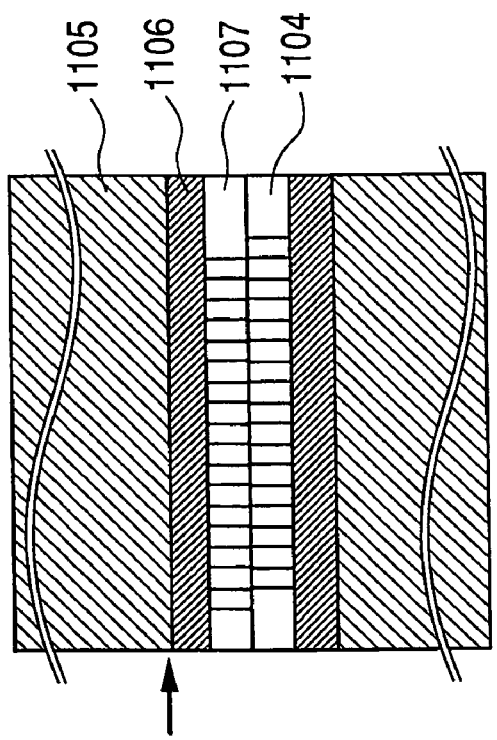
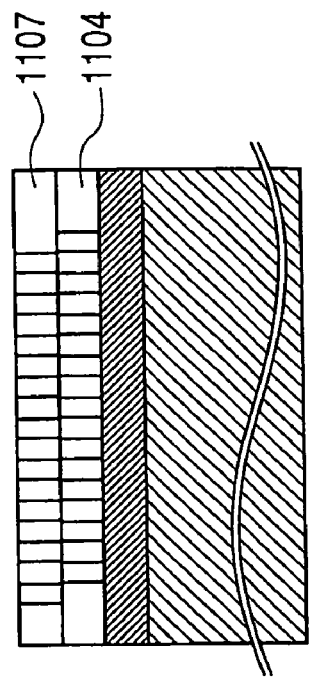

METHOD FOR FABRICATION OF OPTICAL ELEMENT, AND OPTICAL ELEMENT HAVING THREE-DIMENSIONAL LAMINATED STRUCTURE

TECHNICAL FIELD

The present invention relates to an optical element having a three-dimensional laminated structure, concerned with electromagnetic waves including visible light, terahertz waves, microwaves and X-rays, and a method for fabrication of the optical element. Optical elements are widely used to display and transfer images, in optical communications, including data communications, information processors using light, and sensors and detection systems for detecting various types of information, such as image and biological information, at a high level of sensitivity.

BACKGROUND ART

In recent years, an optical material called photonic crystals having a periodic refractive index distribution and techniques using the material have been receiving attention. The techniques include, for example, techniques for fabricating photonic crystals with an optical material, and techniques utilizing behavior of light in photonic crystals and techniques utilizing a phenomenon in which a luminous state of a luminous material existing in photonic crystals is controlled (E. Yablonovitch: "Phys. Rev. Lett" Vol. 58, p. 2059, 1987). A possibility of applying these techniques to the optical element is controversial.

In association with the technique of the optical element, so called DFB (distributed feedback) lasers effectively using one-dimensional periodic structures for semiconductor lasers and the like have gone into actual use. Basic studies for applying two-dimensional photonic crystals including a two-dimensional periodic arrangement of cylindrical pores to optical communication parts are vigorously conducted.

In two-dimensional photonic crystals, however, performance of light control in one non-periodic direction (direction of thickness in general) is inferior to performance of light control in other two periodic directions. This raises a problem when various optical elements, including optical communication parts, and systems using light are built. Some attempts are made to use three-dimensional (3D) photonic crystals forming periodic structures in all three directions.

Examples of three-dimensional photonic crystals, which have been developed to date, include crystals called lattice type crystals or wood pile type crystals (U.S. Pat. No. 5,335,240 (Ho et al.), Noda: "Photonic Crystals—Application, Technology and Physics," p. 128, 2002, CMC press.), crystals fabricated by a micromechanic fabrication method (Hirayama et al: "Photonic Crystals—Application, Technology and Physics—," p. 157, 2002, CMC press.), and crystals fabricated by a thin film deposition method called self cloning (S. Kawakami "Fabrication of submicrometre 3D periodic structures composed of Si/SiO$_2$," Electron. Lett., Vol. 33, pp. 1260-1261 (1997), International Patent Laid-open WO98/44368 publication and Sato: "Photonic Crystals—Application, Technology and Physics," p. 229, 2002, CMC press.).

The biggest challenge in attempts to fabricate such three-dimensional photonic crystals is fabrication of a complicated three-dimensional structure in a fine period. The challenge is a technique for fabricating a three-dimensional form in which the period required in photonic crystals intended for near-infrared light wavelengths, visible light wavelengths, ultraviolet light wavelengths and the like, which are important especially in terms of application, is 1 µm or less, particularly on the order of 100 nm. Quality, such as dimensional accuracy and interface roughness, at 1 to 2 orders below the period is considered important. Values required as dimensional accuracy and roughness of the surface and the side face are, for example, about 1 to 10 nm. The roughness of the surface and the side face at this level causes scattering of light. Scattering of light causes a considerable loss in photonic crystals using multiple reflection and multiple beam interference as an operational principle, resulting in significant degradation in performance of the element.

For achieving a practical product, it is important that a plurality of elements can be fabricated at a time from a wafer material having a large area as in the case of many semiconductor parts. For example, if elements that are generally 10×10 µm$^2$ to 1×1 mm$^2$ in size can be fabricated from a wafer having an area of about 100×100 mm$^2$, the number of elements that can be made from one wafer is increased and the cost is reduced.

It is very important that one element itself has a large area. This is because an element having a large area can provide a display or system in a form of one element.

For such needs, it is difficult to fabricate three-dimensional photonic crystals having a large area in a sufficiently high quantity and good quality using a conventional method. Specifically, in a conventional method in which the lattice of a compound semiconductor, such as GaAs, is welded, it is difficult to increase an area because the size of a substrate, such as GaAs, is limited, and it is difficult to reduce the cost of fabricating three-dimensional photonic crystals required to have a plurality of layers because such a substrate is expensive. Even if a method of depositing layers by micromechanic handling is used, the handling of a thin film having a large area is difficult in itself, and it is very difficult to maintain alignment across the large area.

If light having a wavelength of 1.3 to 1.5 µm, like near-infrared light for optical communications, is controlled, the thickness of each layer in a direction of deposition may be 0.3 to 0.5 µm. Thus, the existing method described above can be useful. However, if the element is considered for use with visible light, the thickness of each layer for about 0.4 µm equivalent to a wavelength of blue light must be 100 nm or less. Therefore, control and fabrication by the conventional method is difficult. In 3D photonic crystals, the thickness of each layer sensitively influences the optical performance even for near-infrared light in 3D photonic crystals. Thus, it is important to reduce the thickness of layers and provide high accuracy either in terms of improving accuracy or purposely adjusting the thickness of each layer finely to obtain high optical performance. In the conventional technique, it is difficult to provide a thickness on the order of 1 to 10 nm across a large area of 100×100 mm$^2$.

In applications in which photonic crystals are used for routing elements for three-dimensional optical wiring and optical communications, not only a material should be arranged periodically, but also non-periodic structural parts called defects are introduced at desired positions to improve functions. In the conventional method, however, introduction of defects is difficult in itself, and it is difficult to perform position control of such defects across a large area.

For example, the self-cloning method has a problem in that it is difficult to introduce defects freely. Thus, functions cannot be improved.

As described above, the prior art described above cannot fully meet the strict requirements for 3D photonic crystals and devices and systems using the 3D photonic crystals.

DISCLOSURE OF THE INVENTION

According to an aspect of the present invention, there is provided a method for production of an optical element comprising the steps of:

(A) forming a first layer on the surface of a first substrate by epitaxial growth or micropore-making;

(B) forming a porous layer on the surface of a second substrate;

(C) forming a second layer on the surface of the porous layer by epitaxial growth or micropore-making;

(D) bonding the first layer and the second layer to each other; and (E) separating the second substrate from the second layer at the porous layer.

The method preferably further comprises step (F) of forming a refraction index distribution pattern on the first layer after step (A).

The method preferably further comprises step (G) of forming a refraction index distribution pattern on the second layer after step (C).

The steps (B) to (E) are preferably repeated with the outermost layer on the first substrate as the first layer after step (E). The refraction index distribution pattern formed on the second layer is preferably a pattern having a periodic refraction index distribution formed in at least one direction as a result of repeating steps (B) to (E). The second substrate in step (B) in a cycle is preferably reused as the second substrate in step (B) in a following cycle. The method preferably further comprises a step of placing a light emitting element layer between layers.

Step (B) is preferably a step of forming a porous layer comprised of two layers different in porosity and the separating in step (E) is carried out at the boundary of the two layers.

According to another aspect of the present invention, there is provided a method for production of an optical element comprising the steps of:

(a) forming alternating porous layers and microporous layers on a first substrate;

(b) forming a refraction index distribution pattern on the microporous layers collectively;

(c) bonding a second substrate to the porous layer or microporous layer being the outermost layer;

(d) separating a pair of microporous layers spaced by the porous layer at the porous layer;

(e) shifting the separated microporous layers from each other along an in-plane direction, and bonding the shifted microporous layers to each other; and (f) repeating the steps (d) and (e) for each porous layer.

According to still another aspect of the present invention, there is provided an optical element in which layers having refraction index distribution patterns formed thereon are deposited to form a three-dimensional periodic distribution of refraction index, wherein a period of the refraction index in a direction of deposition is determined by the thickness of the plurality of layers and a sequence of refraction index distribution patterns of the deposited layers. Therein, a light-emitting layer is preferably placed between the layers to form a photonic crystal laser. A light-emitting layer having in the direction of deposition a plurality of periodic refraction index distributions different from each other and emitting a light of a wavelength corresponding to each period is more preferably placed two-dimensionally along the layer.

According to a further aspect of the present invention, there is provided an optical device comprising:

a light source layer emitting a light of a specific wavelength; and photonic crystals formed on the light source layer and including a light emitting layer, which receives the light emitted from the light source layer and emits a light of a wavelength different from a wavelength of the received light, wherein the photonic crystals are photonic crystals in which the wavelength of the light emitted from the light source layer is out of a photonic band gap and the wavelength of the light emitted from the light emitting layer is within the photonic band gap. A plurality of photonic-crystal layers are preferably stacked, and the wavelength of a light emitted from the light emitting layer in a lower photonic crystal layer is out of a photonic band gap of an upper photonic crystal layer.

BRIEF DESCRIPTION OF THE DRAWINGS

FIG. 3 is a schematic diagram showing one example of a configuration of large area three-dimensional photonic crystals of Example 1;

FIGS. 10A, 10B, 10C and 10D are schematic diagrams showing a method for fabrication of three-dimensional photonic crystals using microporous-Si of Example 3;

BEST MODE FOR CARRYING OUT THE INVENTION

Figure 1A:
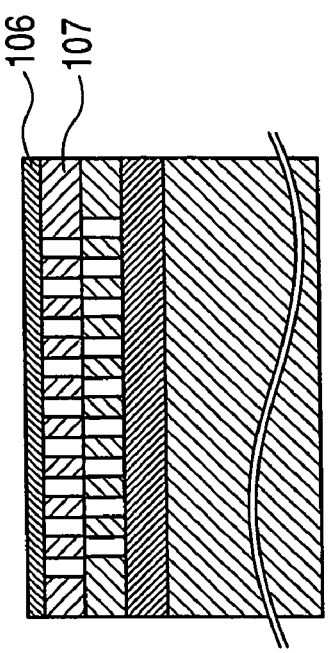
FIGS. 1A, 1B, 1C and 1D are schematic diagrams showing a method for fabrication of three-dimensional photonic crystals with Si of Example 1.

Terms in this specification will be defined below.

The term "microporous layer" means a porous layer formed by micropore-making. In the present invention, a microporous layer is used as a layer where optical devices are formed therein. That is, a microporous layer is an alternative to an epitaxial layer. On the contrary, the term "porous layer", which is referred to without the prefix "micro-", means a layer that is not used as a layer for making devices, but is used an a sacrificial layer for separating a microporous layer or an epitaxial layer from a substrate.

A porous layer has any pore size. It may have a pore size larger or smaller than, or similar to, a microporous layer. However, when a porous layer is provided just under a microporous layer for separating it from a substrate, the pore sizes of the porous layer should be different from the microporous layer.

Parts used in the process of forming an optical element are defined as follows. Names of a part comprised of a substrate and a portion comprised in the part together with the substrate are given the ordinal number of the substrate. For example, layers formed on the surfaces of a first substrate and a second substrate in step A and step C are referred to as a "first layer" and a "second layer," respectively.

The first layer and the second layer may be comprised of at least one of a layer obtained by epitaxial growth (hereinafter referred to simply as "epitaxial growth layer" or "epi layer") and a microporous layer.

A part of a pre-completed optical element including a substrate and a layer formed on the surface of the substrate, obtained in Step A and Step C, is referred to as a "member."

A member comprised of the first substrate and the first layer is referred to as a "first member" and a member comprised of the second substrate and the second layer is referred to as a "second member."

A pattern formed from a periodic difference in refractive index, which is formed on the layer, is referred to as a "refractive index distribution pattern."

A layer, before it is provided with the refractive index distribution pattern, is referred to as a "non-patterned layer."

A member comprised of the substrate and the non-patterned layer is referred to as a "non-patterned member."

A layer after patterning is referred to as a "patterned layer."

A member including the substrate and the patterned layer is referred to as a "patterned member."

A member immediately before bonding a layer thereto in Step D is referred to as a "pre-bonded member." Thus, if Step D is carried out with first and second patterned members without further processing the patterned members, the patterned members are a "first pre-bonded member" and a "second pre-bonded member", respectively.

The term "device layer" means a layer composed of a material allowing an electromagnetic wave, such as visible light, near-infrared light or ultraviolet light (hereinafter referred to simply as "light"), to pass without scattering, and used for an optical device in a form of a single or laminated multilayer as a medium propagating light. Thus, each patterned layer having a refraction index distribution pattern of photonic crystals constituting an optical device is a device layer. An example of the optical device will be described in detail in this description. If the "first layer" and the "second layer" have refraction index distribution patterns and constitute photonic crystals constituting the optical device, the layers may be referred to as a "first device layer" and a "second device layer," respectively.

One of preferred forms of the present invention is characterized by comprising:

non-patterned member preparing steps of preparing a first non-patterned member having a first non-patterned layer formed on a first substrate (step A) and preparing a second non-patterned member having a porous layer for layer separation formed on a second substrate (step B) and having formed thereon a second non-patterned layer composed of an epitaxial growth layer and/or a microporous layer (step C);

a pattern forming step of forming a refraction index distribution pattern on at least one of the first non-patterned layer and the second non-patterned layer (step F and/or step G); and a laminated structure forming step of bonding the first layer and the second layer to each other (corresponding to step D and referred to as "bonding step"), then performing layer separation at the porous layer for layer separation (corresponding to step E and referred to as "separation step") to separate the second substrate from the second layer, whereby a laminated structure comprised of the first and second layers is formed on the first substrate (see Examples 1 to 3 described later). That is, the non-patterned member separating steps correspond to steps A, B and C, the pattern forming step corresponds to step F and/or step G, and the laminated structure forming step corresponds to steps D and E. Incidentally, porosities of the microporous layer, as well as of the ordinary porous layer, are physically capable of being used for such a separation as in the separating step. If the first or second layer formed in the member preparing steps has a refraction distribution pattern that has been intended, the member preparing step is a patterned member preparing step. In this case, the pattern-forming step is carried out in the member preparing step. For example, if a spatial frequency finally obtained when the first layer or second layer is formed by micropore-making is equal to that of a spatial frequency associated with an intended refraction distribution pattern, it can be said that the finally obtained layer is a patterned layer. Thus, the member preparing step that is comprised of the micropores-making is the patterned member preparing step.

Other methods for preparation of the optical element of the present invention include a fabrication method characterized by comprising:

a patterned member preparing step of preparing a first patterned member having ordinary porous layers and microporous layers formed in an alternating manner on a first substrate, such as silicon, and having a refraction index distribution pattern formed collectively in the microporous layer, and a second substrate; and a laminated structure forming step of forming a laminated structure on the second substrate by sequentially carrying out in each ordinary porous layer a process of bonding together a top layer of the first patterned member and the second substrate, then separating the bonded material by the ordinary porous layer, removing the ordinary porous layer used for the separation, and bonding together microporous layers above and below the ordinary porous layer with the microporous layers shifted from each other by an appropriate distance along an in-plane direction (see fabrication method in FIGS. 15A to 15D).

Other methods for fabrication of the optical element of the present invention include a method characterized in that different types of microporous layers are formed in an alternating manner on a substrate, such as silicon, refraction index distribution patterns produced by a difference in refraction index are formed collectively on microporous layers, and microporous layers are shifted from one another along an in-plane direction to form a laminated structure (see fabrication method in FIGS. 16A to 16D).

The laminated structure formed by each method for fabrication of the optical element described above has an almost periodic refraction index distribution in at least one direction. In this way, photonic crystals are realized.

Further, the following aspect is possible.

The substrate and the epitaxial growth layer and/or microporous layer are made of the same material, such as silicon (see Examples 1 and 2 described below).

The epitaxial growth layer and/or microporous layer and the substrate of these materials have a similar lattice constant and/or linear expansion coefficient of crystals, the substrate is made of germanium or the like, and the epitaxial growth layer and/or microporous layer are made of GaAs, GaP or the like (see Example 2 below).

Figure 12A:
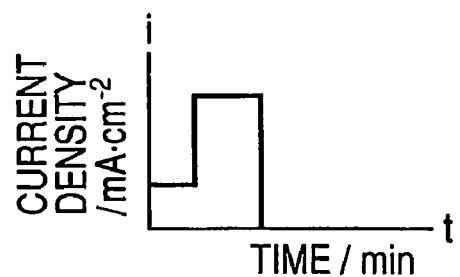
FIGS. 12A and 12B are graphs showing a change of an injected current with time in an anodization process.

The layer on the substrate is an epitaxial growth layer that has been made porous. Pore-making is achieved by anodization or the like. In anodization, a voltage is applied to pass a current, and pore-making proceeds at the deepest part of the pore. The larger the current density at which anodization is performed, the rougher the porous structure that is obtained. Methods for fabrication of a porous layer composed of a plurality of porous layered areas having different porosity degrees, such as a porous layer for layer separation, include a method in which voltages allowing large and small two current densities to be obtained are applied for a time period corresponding to a predetermined thickness of porosity, as shown in FIG. 12A. Particularly, if the microporous layer is formed by anodization, it is important that a void content giving a required refraction index is set, and a voltage giving a current density allowing the void content to be obtained is applied for an appropriate time period.

Figure 11:
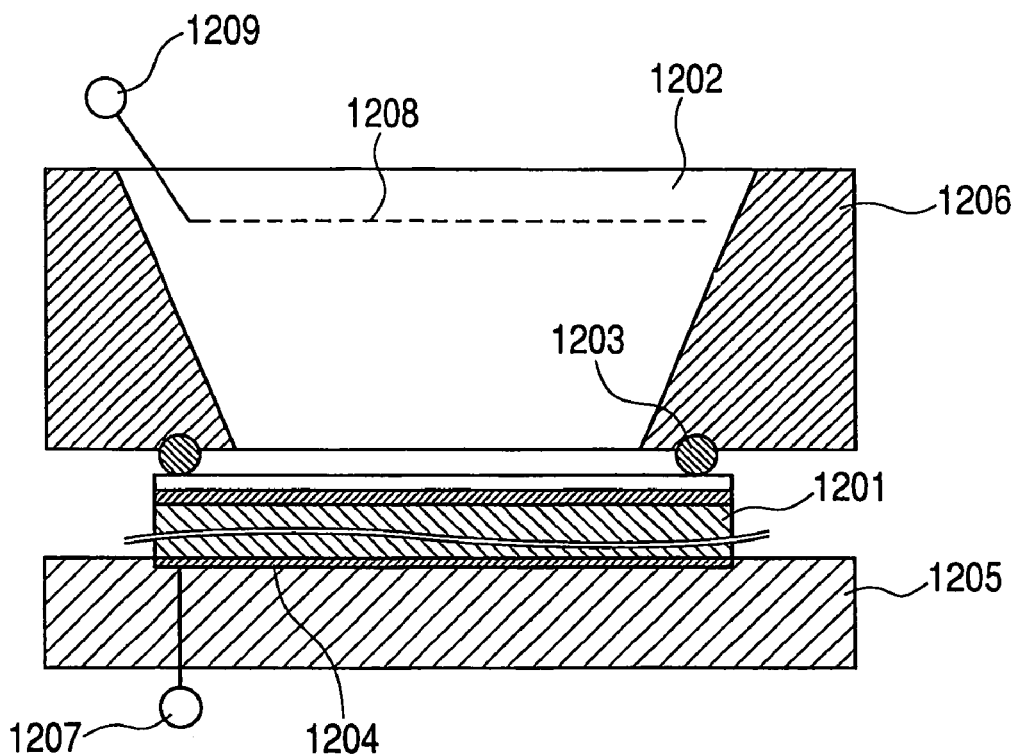
FIG. 11 is a schematic sectional view showing one example of an anodization method for formation of porous-Si layers of Example 3.

FIG. 11 is a schematic diagram showing one example of an apparatus configuration for forming the surface of a wafer into a porous layer, i.e., an ordinary porous layer or microporous layer by anodization. In FIG. 11, a wafer 1201 is held such that the surface thereof is immersed in an HF solution 1202. The holding of the wafer 1201 is done by a lower support 1205 and an upper support 1206 via an O ring 1203 and a Pt plane electrode 1204. A cistern for HF leading to the wafer 1201 is formed on the upper support 1206 and is filled with the HF solution. A Pt mesh electrode 1208 is placed in the HF solution 1202. The Pt plane electrode 1204 is connected to an anode 1207 and the Pt mesh electrode 1208 is connected to a cathode 1209, and a predetermined voltage is applied to the surface of the wafer 1201 via the HF solution 1202 to obtain a predetermined current density.

The method in accordance with the present invention can be applied to form various optical elements.

A laser can be fabricated by introducing a laser medium into a predetermined layer in the laminated structure (see Example 4 described below). In the predetermined layer in the laminated structure, a laser medium can be introduced at and around the position of a non-periodic pattern with the non-periodic pattern included at a predetermined in-plane position.

At least one of a red light source, a green light source and a blue light source can be constituted by such a laser system to fabricate a display apparatus (see Example 5 described below).

A three-dimensional optical wiring, optical circuit or the like can be provided by using a three-dimensional waveguide formed by mutually connecting a deposition direction defective waveguide passing through a plurality of layers and formed in the direction of deposition and an in-plane defective waveguide formed on the layers in an in-plane direction (see Example 6 described below).

A laser sensor system can be fabricated by providing at least one laser sensor formed using the laser system described above and characterized by detecting an oscillation state of a laser, forming a very small channel system near the laser sensor, and detecting information about a fluid flowing through the very small channel (see Example 7 described below).

In view of the problems described above, the optical element of the present invention is characterized in that a plurality of layers including layers having at least one of an epitaxial growth and micropore-making type are deposited to form the optical element as a three-dimensional structure, and a refraction index distribution pattern produced by a difference in refraction index is formed in the plane of at least one layer. In this case, in the refraction index distribution pattern, the three-dimensional structure can have almost a periodic refraction index in at least one direction. One unit of the refraction index distribution pattern in the direction of deposition may be formed by linkage of refraction index distributions formed in planes of a plurality of layers deposited in the direction of deposition (see FIGS. 8A and 8B).

The optical element for display of the present invention is characterized by comprising:

a light source portion capable of emitting independently at least two beams including a beam for display and a beam for excitation in a controllable manner; and a photonic crystal portion including a light emitting element portion formed on the light source portion, wherein the light emitting portion is arranged such that it can receive the beam for excitation and oscillate, and the photonic crystal portion is formed such that it allows the beam for display to pass but the oscillation wavelength of the light emitting element portion is within a photonic band gap (see Example 5 described below).

The member preparing step and the laminated structure forming step can be repeated two or more times to form a laminated structure. Usually, about 8 layers are required for light blocking control using the photonic band gap. Thus, if a defect is formed at the center to perform light containment control, for example, a laminated structure having 16 layers in total, i.e., 8 layers on each of both sides of the defect, is required.

As described above, the present invention realizes an optical element having a three-dimensional laminated structure having a refraction index distribution pattern using layer separation between different porous layers. In this way, by using a method for fabrication of photonic crystals, nanophotonic elements and the like, using a device layer relocation technique, the optical element can be realized with a high-functional three-dimensional optical element or system having a relatively large area and having defects and the like introduced without restraint, and fabricated at a lower cost than was previously possible. The optical element can be realized with a high-functional device in a visible light range using, for example, a nanophotonic element made to have a micropourus structure by anodizing the epitaxial growth layer or the like of the present invention.

Specific embodiments will be described below with reference to the accompanying drawings to specify the embodiments of the present invention.

EXAMPLE 1

In this Example, a nanophotonic element is produced by using silicon as a material for three-dimensional photonic crystal.

The first step of this Example is comprised of a step of preparing the first member and a step of forming a pattern. Of the first steps shown in FIG. 1A, a silicon layer 102 having a porous structure of two layers having different porous densities is formed on an Si substrate 101 by anodization in the step of preparing the first member. By changing the conditions of anodization, two layers having different porous densities can be formed. A monocrystal silicon layer 103 (which does not have to be a monocrystal in a strict sense; the same applies to monocrystals used elsewhere) is grown thereon as the first layer of the present invention by epitaxial growth to a pre-determined thickness. Since the silicon layer 103 formed by epitaxial growth is used as a device layer after the step for forming a pattern, the thickness is determined according to the optical element to be formed.

Then, as the step for forming a pattern, patterning is conducted by photolithography on the epitaxially grown silicon layer 103 to form a pre-determined spatial pattern. Since this pattern functions as a layer that creates a periodic refractive index distribution of the 3D photonic crystal, a semi-periodic structure is formed in at least one direction. In this Example, the first patterned layer 103 forming a refractive index distribution pattern is a layer used in the form of a multi-layer laminate for a nanophotonic element, which is an optical element, that is a device layer, and therefore, the layer is referred to as the "first device layer." A non-periodic structure, which is a defect for the periodic structure, can be introduced at a pre-determined position. For patterning, various techniques other than using light, such as EB (electron beam) lithography, evanescent near-field lithography, x-ray lithography, ion beam lithography, nanoimprint and patterning combining nanoimprint and anodization can be used.

In this Example, examples of the pattern of the epitaxially grown monocrystal silicon layer, which is the device layer, are shown in FIGS. 2A to 2D. Here, the pattern of FIG. 2A was selected as the pattern of the monocrystal silicon layer 103. As for the size of the first device layer 103, the thickness of the layer was about 0.25 μm, assuming that the wavelength of the light to be used was 1.5 μm. The period of the pattern was about 0.7 μm. The first member was formed in this manner. These procedures so far are in the step for preparing the first member. In the case of using visible light, the sizes are about ½ to ¼ of the values, but the above-mentioned structure of the first member can be used as it is.

Figure 1C:
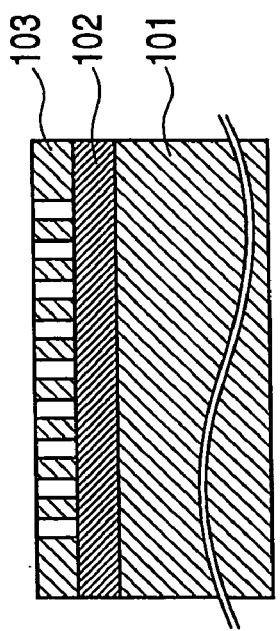
Figure 1D:
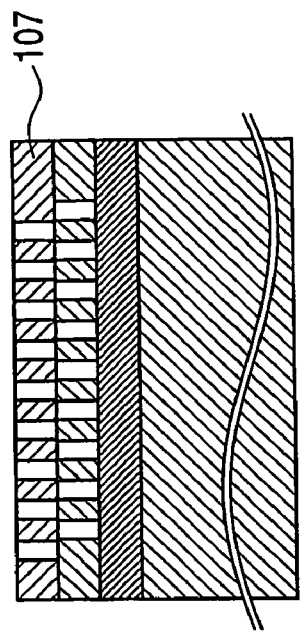
Figure 1B:
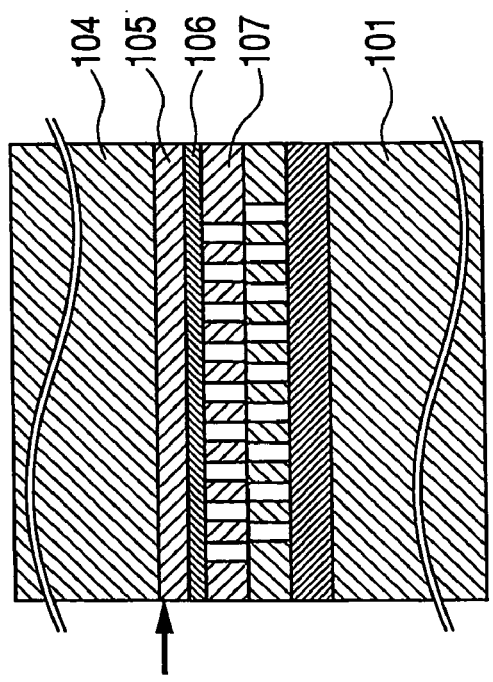

Next, as the step for preparing the second member, which constitutes the first half of the second step of this Example, the same procedures as in the step for preparing the first member are carried out for the second substrate 104 comprising Si. The obtained second member is shown in FIG. 1B. In the figure, the silicon layers constituting the formed porous layer 111 and having a porous structure of two layers having a different porous density are represented by reference numerals 105 and 106. The monocrystal silicon layer epitaxially grown on the porous silicon layer is represented by reference numeral 107. Next, as the second half of the second step, patterning different from the pattern formed on the first device layer 103 in the first step is conducted on the monocrystal silicon layer 107 by photolithography to form a pre-determined spatial pattern. In this Example, the pattern shown in FIG. 2B was formed on the layer 107. The patterned monocrystal silicon layer 107 is also a device layer and is referred to as the "second device layer" in this Example.

The first part of the third step includes a bonding step in the step for forming a laminate structure. As shown in FIG. 1B, the device layers on which different patterns are formed are properly aligned, placed opposite each other and jointed by melt adhesion or lamination. For bonding, direct bonding can be employed. As an example of the direct bonding, a natural oxide film is removed by washing the silicon surface by a mixture of $H_2O_2$ and $H_2SO_4$; the smooth surfaces having hydroxyl groups are laminated at room temperature to create a hydrogen bond; dehydration condensation is carried out on the interface by heating to a high temperature of about 500° C.; and the remaining oxygen is diffused by increasing the temperature to about 1,000° C. to achieve a strong bonding of silicon atoms.

The second part of the third step is a separating step in the step for forming a laminate structure. The porous layer 111 is separated in a direction parallel to the layer so that the jointed device layer is left on one of the substrates. The separation is conducted by water jet (hereinafter referred to as WJ) toward the boundary between the two porous layers 105 and 106 having different porous densities, as shown by an arrow in FIG. 1B. In such a boundary, mechanical stress remains due to the mismatch of the lattice constant caused by the difference in the porous density. Accordingly, upon the application of the WJ, release of the remaining stress and separation of lattices having different lattice constants proceed half spontaneously.

The fourth step includes a removing step and a smoothing step as described in the following. A porous layer remains on the second device layer after the separating step, as shown in FIG. 1C. Thus, the porous layer is removed by selective etching. As shown in FIG. 1D, the remaining porous layer 106 on the surface is removed while leaving the second device layer 107. This step is referred to as the "removing step."

Then, the surface of the second device layer 107 from which the porous layer is removed is smoothed. The step is referred to as the "smoothing step." The surface of the second device layer 107 from which the porous layer is removed is subjected to an annealing treatment in 100% $H_2$ at 1,050° C. and smoothed to the atomic level.

According to these four steps, a structural body in which two differently patterned epitaxially grown silicon layers on wafer are jointed and laminated can be obtained. The substrate 104 separated by separation of the porous layers can form a porous layer and an epitaxially grown layer again, which means that it is reusable. The substrate, which has been separated and is intended for reuse, the second substrate 104 in this Example, is referred to as the "seed substrate".

From the fifth step onward, by using the structural body obtained by the first to the fourth steps as the new first member and repeating the second step through the fourth step, the number of laminated device layers can be increased. Layers are laminated by this method to a pre-determined number optically necessary for a photonic crystal. Specifically, the second member is prepared using the seed substrate 104 and subjected to patterning. The resulting structure is jointed to the first member, which is a wafer having a plurality of device layers laminated so far, as shown in FIG. 1B, and then separation, removal of the porous layer and smoothing are carried out as in FIGS. 1C and 1D. For the pattern in the case of repeating, each device layer is laminated, for example, in the order of FIGS. 2A, 2B, 2C, 2D, 2A, 2B, . . . , and several embodiments are available for repeating.

It is possible that in the first step, the porous layer 102 of the first member is formed to have two layers with different porous densities as in the second member, several layers are laminated by repeating the second step to the fourth step, the second member is finally jointed and then the porous layer 102 is separated to complete the separation. In this case, the porous layer 105 for the separating step may not be formed on the second member.

After going through all the steps for obtaining a required number of layers, a three-dimensional photonic crystal as schematically shown in FIG. 3 is obtained. Since epitaxial growth is employed as a means for forming a thin layer for fabricating a three-dimensional photonic crystal in this Example, the thickness of each layer can be reduced to be on the order of 10 nm, providing a large area of a photonic crystal for short-wave light, such as green and blue visible light and ultraviolet light. In addition, each layer has a smooth surface at the atomic level, i.e., on the order of 1 nm. According to the achievement of such smoothness, a high-quality, large area photonic crystal that is substantially free of the scattering loss of light and the deterioration in quality due to an unexpected defect can be achieved.

Figure 5:
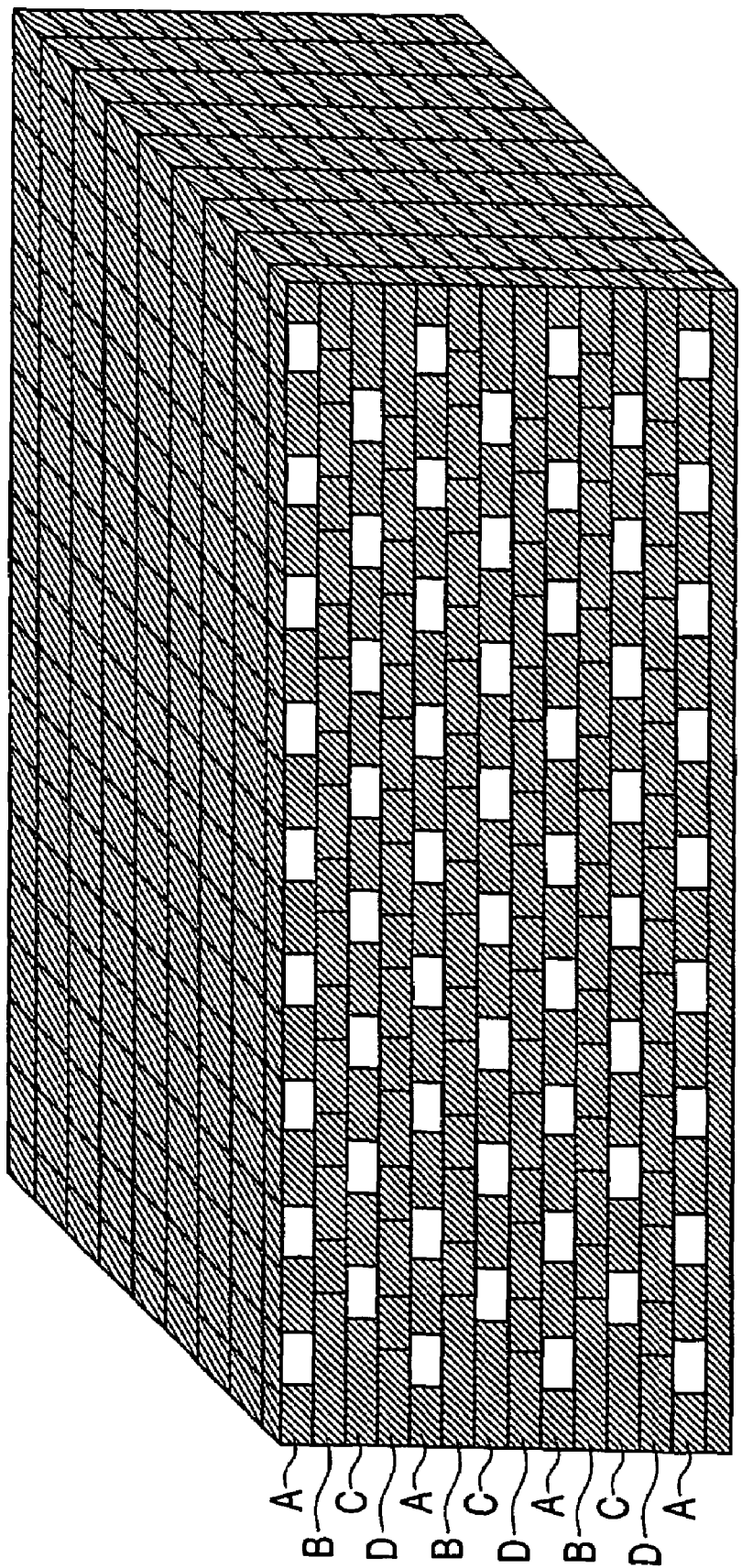
FIG. 5 is a schematic diagram showing another example of a configuration of large area three-dimensional photonic crystals of Example 1.
Figure 6A:
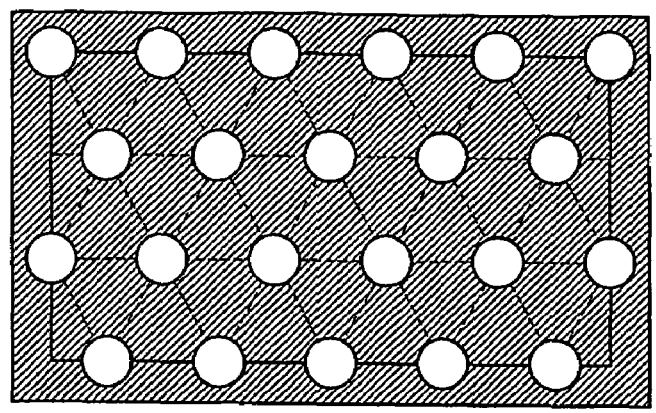
FIGS. 6A, 6B and 6C are schematic diagrams showing another example of a configuration of patterns of layers of Example 1.
Figure 6B:
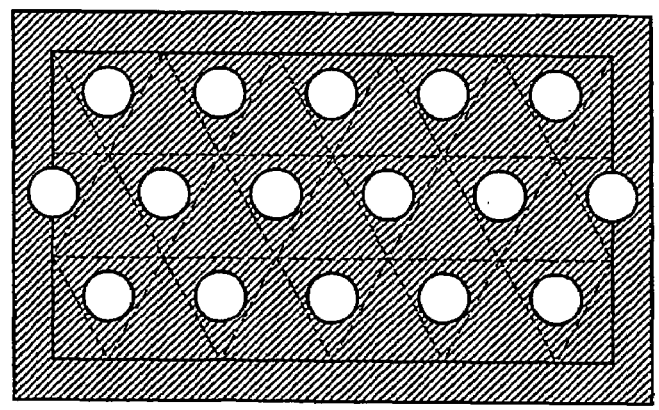
Figure 6C:
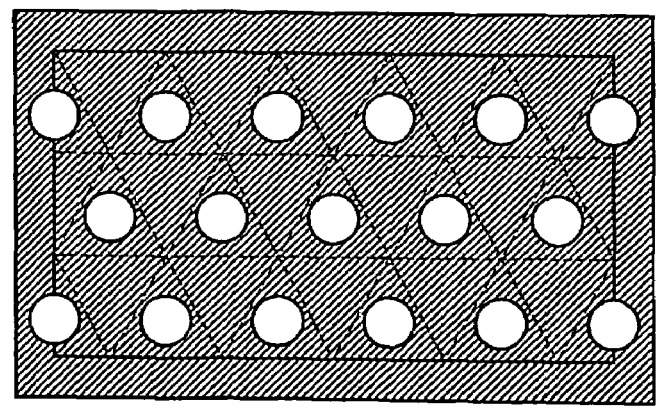

The pattern of each device layer in this Example, as shown in FIGS. 2A to 2D, can be changed accordingly in consideration of the object, the material and the apparatus for patterning. For example, various laminate structures can be prepared, such as a diamond structure (FIG. 5) in which each layer constituted by rectangular parallelepipeds arranged in a checkered pattern shown in FIGS. 4A to 4D is laminated and a periodic structure (FIG. 7) in which each layer having cylindrical pores is arranged in a triangular lattice shown in FIGS. 6A to 6D. In addition, a refractive index distribution pattern can be easily created by shifting the pore of the pattern from the periodic position, changing the size, eliminating pores locally or by specifying the position of a defect three-dimensionally. As described above, according to the production method of this embodiment, the pattern of each layer can be specified and formed independently. Accordingly, a highly flexible laminate structure in which photonic crystals having two periodic refractive indexes are mixed is easily accomplished, and a high performance optical element and optical system using silicon can be achieved.

It is described in this Example that the pattern formed on the non-patterned layer 107 in the step for forming a pattern of the second step is different from the pattern of the first device layer 103. In practice, however, the difference in the patterns between the adjacent layers in the laminate structure may be created by displacing the same pattern in the in-plane direction and laminating as illustrated in FIGS. 4A to 4D and 6A to 6D. Alternatively, the difference may be created by including a layer without a refractive index distribution pattern.

Figure 8A:
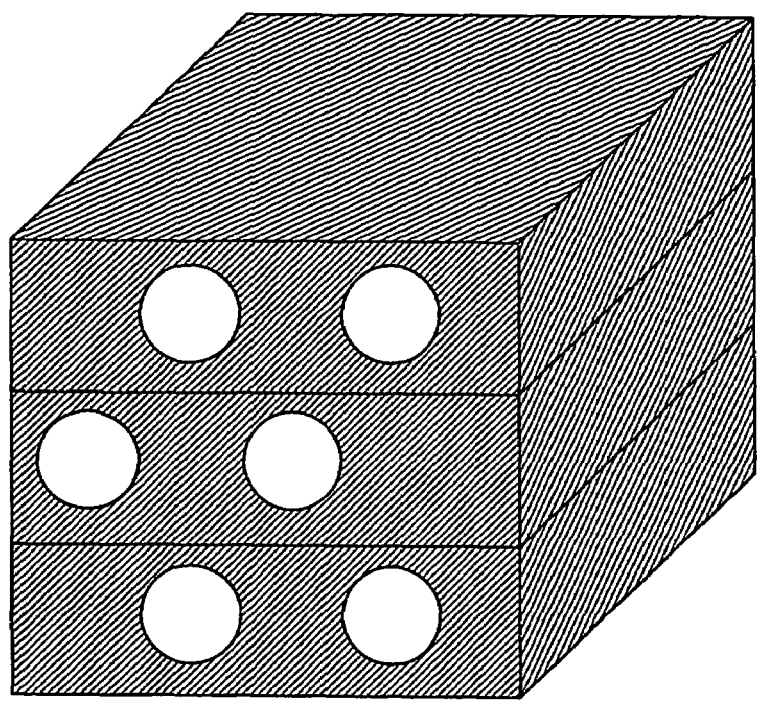
FIGS. 8A and 8B are schematic diagrams showing an example in which one unit of a refractive index distribution pattern of three-dimensional photonic crystals is formed in a multilayer structure.
Figure 8B:
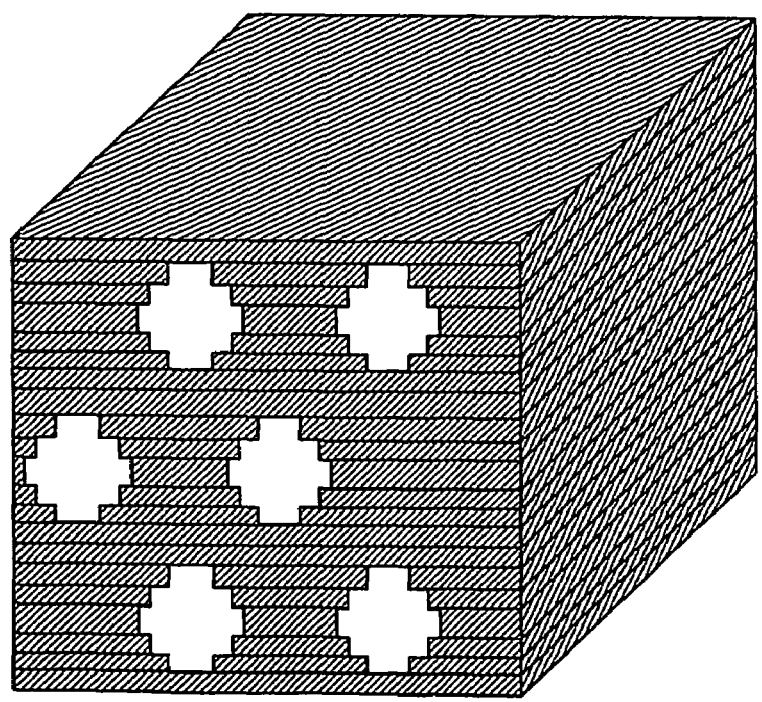

The technique of relocating a high-quality thin film crystal layer, which is a microporous crystal layer prepared from an epitaxial crystal layer or a monocrystal, from the first member to the second member can be applied to a thin film having a thickness of 1 nm to 10 nm. Utilizing this technique, one periodic unit of the periodic refractive index distribution of the photonic crystal in the lamination direction may be constituted by a laminate structure of a plurality of epitaxially grown layers. This structure enables designing of the spatial frequency in the lamination direction by changing only the detail of the periodic unit while maintaining the designed pattern. FIG. 8A shows a periodic unit pattern in the lamination direction. FIG. 8B shows an approximated pattern of FIG. 8A created by laminating a plurality of layers. To approximate a ball having a diameter of 200 nm by a multi-layer structure, an approximate pattern can be formed with a high precision by laminating 20 layers of thin films having a thickness of 10 nm.

EXAMPLE 2

The second Example of the present invention is described below with reference to FIGS. 9A to 9D. In this Example, a nanophotonic element is produced by using GaAs, which is a compound semiconductor, as a material of a three-dimensional photonic crystal and using Ge as a seed substrate.

Figure 9A:
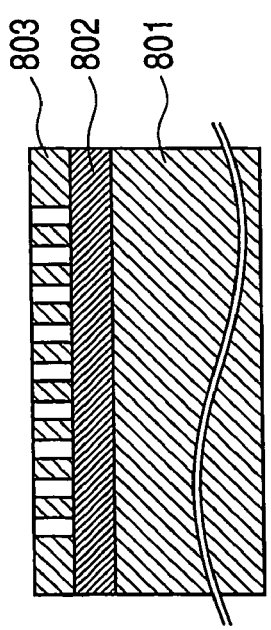
FIGS. 9A, 9B, 9C and 9D are schematic diagrams showing a method for fabrication of three-dimensional photonic crystals of GaAs on Ge of Example 3.

The first step is comprised of a step for preparing the first member and a step for forming a pattern. In the step for preparing the first member, Ge layer 802 having a porous structure is formed on the first substrate 801 comprising Ge by anodization, as shown in FIG. 9A. The first member is prepared by forming the first layer 803 comprising monocrystal GaAs thereon by epitaxial growth to a pre-determined thickness.

Next, the first patterned layer is obtained by conducting patterning for a pre-determined periodic refractive index distribution on the first layer 803 by photolithography to form a layer, which constitutes the 3D photonic crystal, as in the step for forming a pattern of the first step. The obtained layer is the first device layer. A non-periodic structure, which is a defect for the periodic structure, can be introduced at a pre-determined position. Various patterning methods described in Example 1 can be accordingly used.

The second step is comprised of a step for preparing the second member and a step for forming a pattern. As the step for preparing the second member, a two-layer structure porous layer 811 comprising porous layers 805 and 806 having different porosities is formed on the second substrate 804 comprising Ge by anodization, and the second member is prepared by forming the second layer 807 comprising monocrystal GaAs thereon by epitaxial growth to a pre-determined thickness. As the step for forming a pattern in the second half of the second step, patterning for a pre-determined periodic refractive index distribution is conducted on the second layer 807 to form a layer, which constitutes the 3D photonic crystal. This pattern may be the same as the pattern formed on the first layer in the first step provided that the period is completely the same, whereas a pattern slightly different from that of the first layer is to be formed on the second layer if each pattern contains quite a few defects. The second layer on which a pattern is formed is referred to as the "second device layer."

Figure 9B:
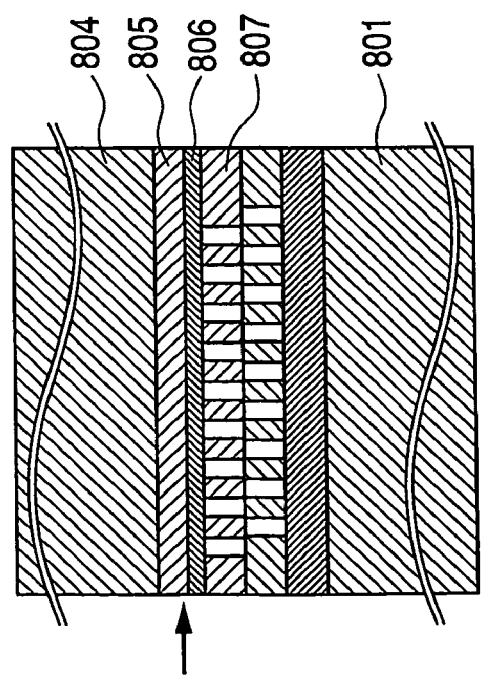

The first half of the third step includes a bonding step. As shown in FIG. 9B, the device layers are properly aligned, placed opposite each other and jointed by melt adhesion or lamination. For bonding, direct bonding described in Example 1 may be used.

Figure 9C:
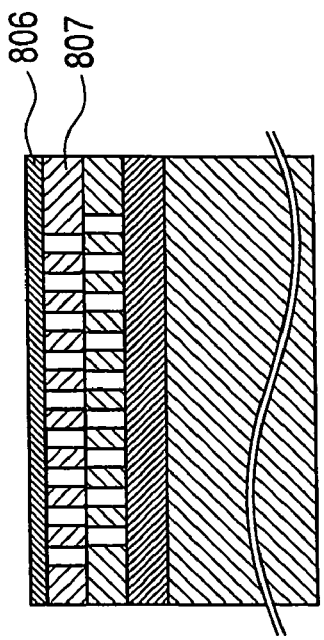
Figure 9D:
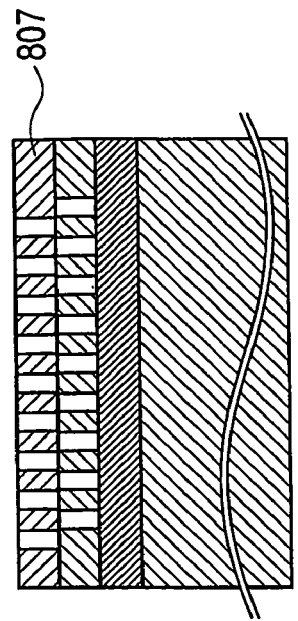

The second half of the third step is a separating step. As shown in FIG. 9C, the porous layer 811 is separated so that the jointed device layer is left on one of the substrates. The separation is conducted by water jet as described in Example 1 toward the boundary between the two porous layers 805 and 806 having a different porous density (shown by an arrow in FIG. 9B).

The fourth step includes a removing step and a smoothing step. Here, a porous layer remaining on the second device layer after the separating step is removed by etching, as shown in FIG. 9C. The surface of the second device layer after removing the porous layer is smoothed to the atomic level by an annealing treatment.

According to these four steps, a structural body in which two patterned epitaxially grown GaAs layers are jointed and laminated on wafer via a porous layer can be obtained. The separated GaAs layer is reusable as in Example 1.

From the fifth step onward, it is possible to increase the number of the device layers to be laminated by repeating the second to the fourth steps in the same manner. Layers are laminated to a pre-determined number optically necessary for a photonic crystal.

After going through all the steps for obtaining a required number of layers, a three-dimensional photonic crystal as schematically shown in FIG. 3 is obtained. GaAs of each layer also has a smooth surface due to the precision of epitaxial growth in the three-dimensional photonic crystal of this Example. Namely, smoothness at the level of 1 nm is maintained. Therefore, a high-quality product that is substantially free of scattering loss of light in the photonic crystal and deterioration in quality due to an unexpected defect can be achieved.

The in-plane pattern of each layer can be specified independently in this Example as well. Accordingly, a highly flexible laminate structure in which photonic crystals having two kinds of periods are mixed is easily accomplished and excellent performance of an optical element and an optical system using GaAs, which is a direct transition optical semiconductor, can be achieved.

In this Example, GaAs was used as the constituent material of the photonic crystal, but materials suitable for a Ge substrate, such as GaP, AlAs and AlP, which have a similar crystal lattice constant and/or linear expansion coefficient, may be used depending on conditions, such as the film thickness.

Figure 7:
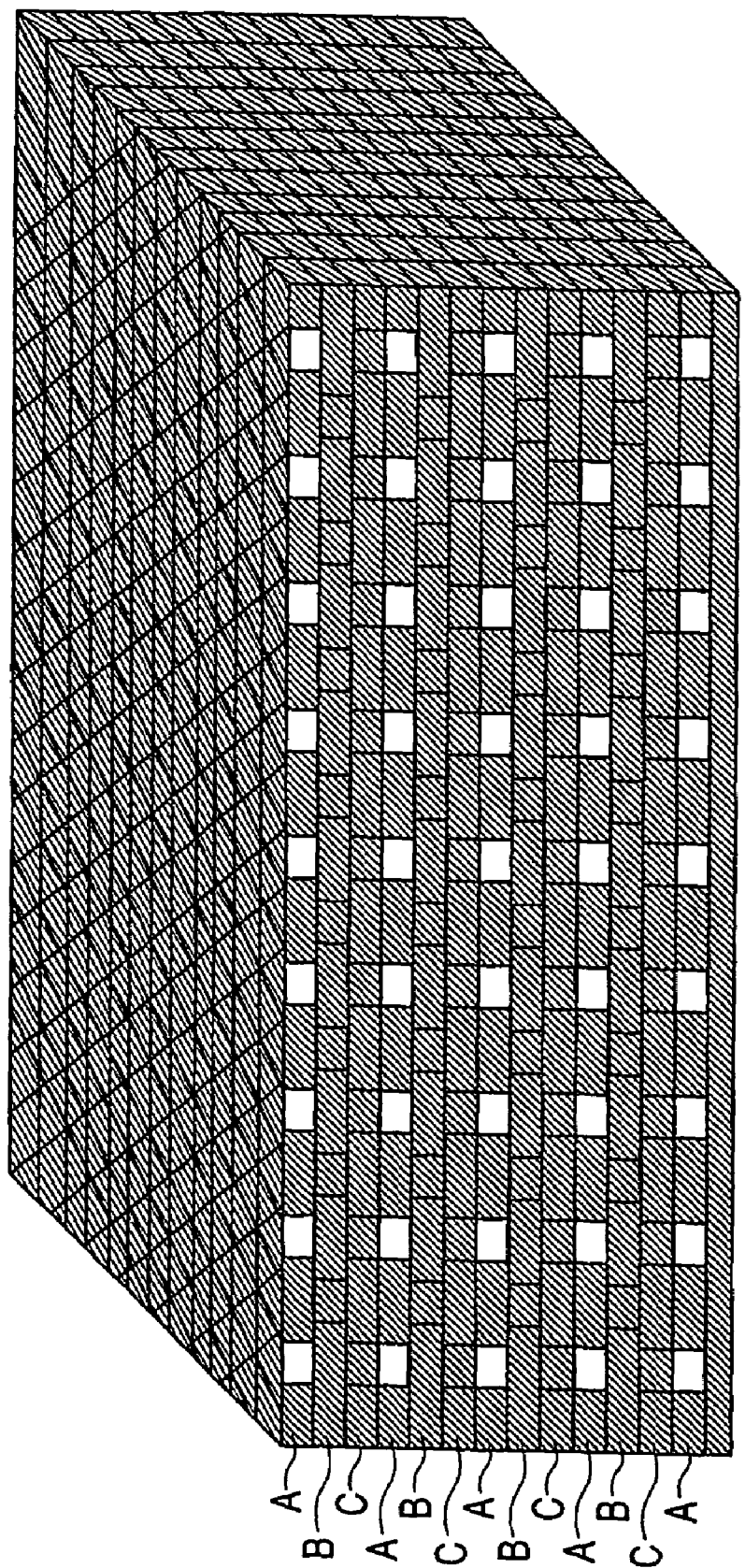
FIG. 7 is a schematic diagram showing another example of a configuration of large area three-dimensional photonic crystals of Example 1.

A structure shown in FIG. 7 can be fabricated using the pattern shown in FIGS. 4A to 4D and FIGS. 6A to 6D in this Example as well. In addition, a structure shown in FIGS. 8A and 8B can also be achieved.

EXAMPLE 3

In Example 3, both the porous layer and the device layer thereon are formed by anodization without the step of epitaxial growth. A three-dimensional photonic crystal having small light absorption in a short-wave range, such as short-wave near-infrared light, visible light and ultraviolet light is provided.

The first step in this Example is comprised of a step for preparing the first member and a step for forming a pattern. In the step for preparing the first member, silicon layer 1103 comprising two porous layers 1102 and 1104 having different porosities is formed on an Si board 1101 by anodization using an apparatus shown in FIG. 11, as shown in FIG. 10A. Of the two layers, the upper layer, i.e., the layer 1104 on the surface, is a microporous layer that transmits light. The microporous layer 1104 has, for example, a typical construction of a pore diameter of about 1 nm to 10 nm and a porosity of about 20% to 80%. This construction makes the refractive index of the layer similar to that of air and improves the transmittance of visible light.

Of the two layers, the lower porous layer 1102 is supposed to have a porous structure different from that of the microporous layer so that the WJ can separate the microporous layer 1104. The types of porous structure may be, for example, macro, meso or micro, and are not limited.

With respect to the relationship between time and the amount of the applied voltage in this Example, voltages allowing large and small two current densities to be obtained are applied for a time period corresponding to a predetermined thickness of porosity, as shown in FIG. 12A. Thereby, a plurality of porous layered areas having different porosity degrees are formed at the surface. As each of the voltages is applied to pass a current, pore-making proceeds at the deepest part of the pore. The larger the current density at which anodization is performed, the rougher is the obtained porous structure. Accordingly, as shown in FIG. 12A, the lower layer has a rougher porous structure formed by the larger current density and the uppermost layer consists of a microporous layer formed by the lesser current density. It is important for forming the microporous layer as the uppermost surface layer to set a void content yielding a required refraction index and to apply a voltage resulting in a current density allowing the void content to be obtained for an appropriate time period. This is because the uppermost surface layer is used as a main portion of an optical device.

Figure 13:
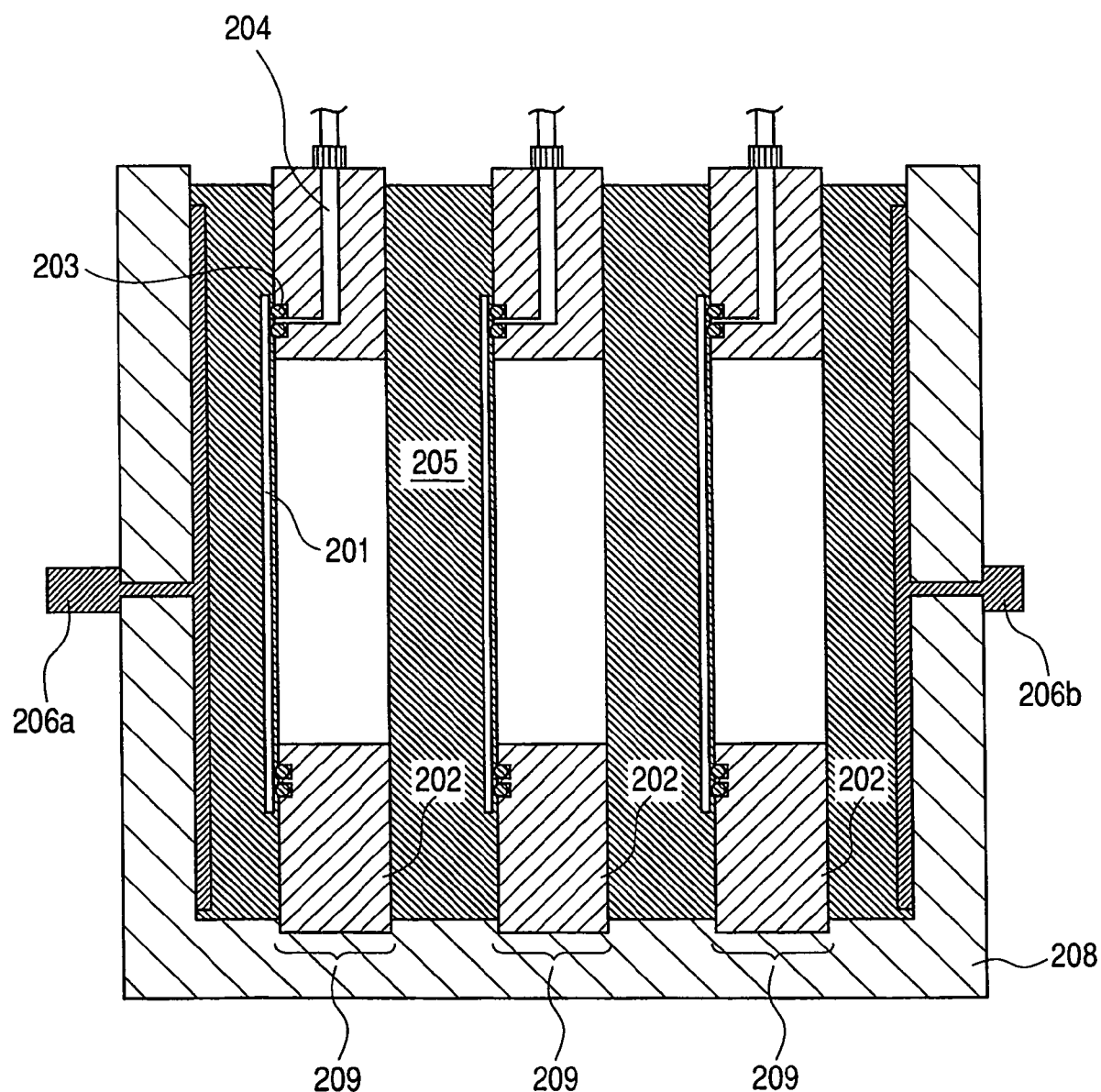
FIG. 13 is a schematic sectional view showing one example of a method for collectively anodizing a plurality of wafers.

For creating pores in this Example, a plurality of wafers 201 can be subjected to anodization all together by using an apparatus shown in FIG. 13. In FIG. 13, reference numeral 202 denotes a wafer holder, reference numeral 203 denotes an O-ring, reference numeral 204 denotes a suction part, reference numeral 205 denotes an HF solution, reference numerals 206a and 206b denote a platinum electrode, reference numeral 208 denotes an anodization bath and reference numeral 209 denotes a holder groove.

In this Example, the constitution for conducting the anodization is not limited to the formation described above, but various general methods can be accordingly used.

Next, the first patterned layer is obtained by conducting patterning for a pre-determined periodic refractive index distribution on the microporous layer 1104 by photolithography to form a layer, which constitutes the 3D photonic crystal, as shown in FIG. 10B, as the step for forming a pattern. The obtained first patterned layer is the first device layer. A non-periodic structure, which is a defect for the periodic structure, can be introduced at a pre-determined position. Various patterning methods described in Example 1 can be accordingly used. The pattern shown in FIG. 2A was employed as the pattern of the first device layer of this Example.

Figure 2A:
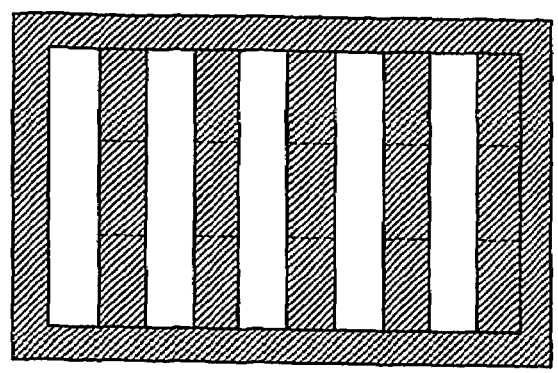
FIGS. 2A, 2B, 2C and 2D are schematic diagrams showing one example of a configuration of patterns of layers of Example 1.
Figure 2B:
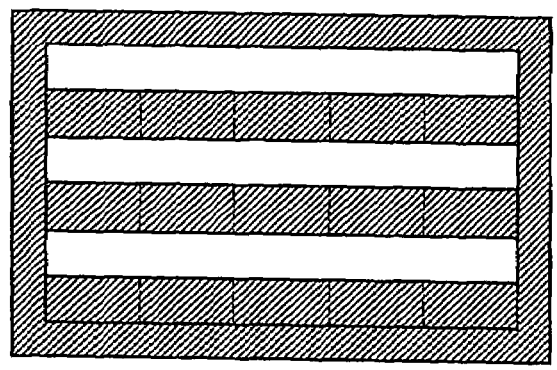
Figure 2C:
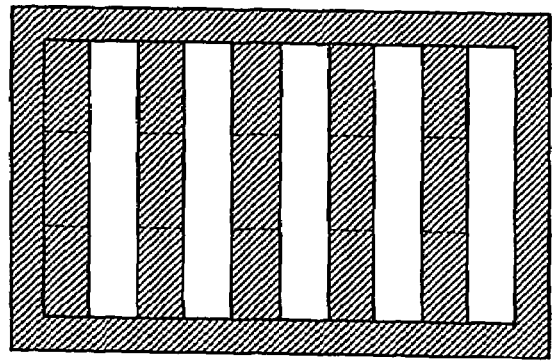
Figure 2D:
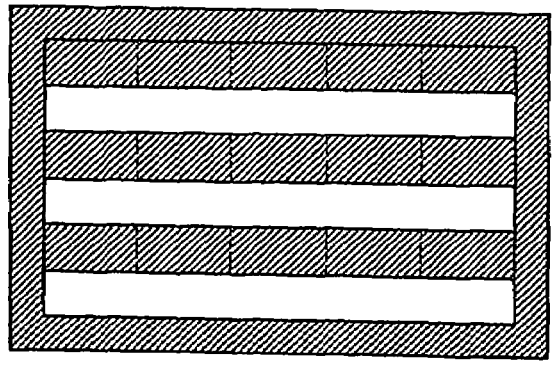
Figure 4A:
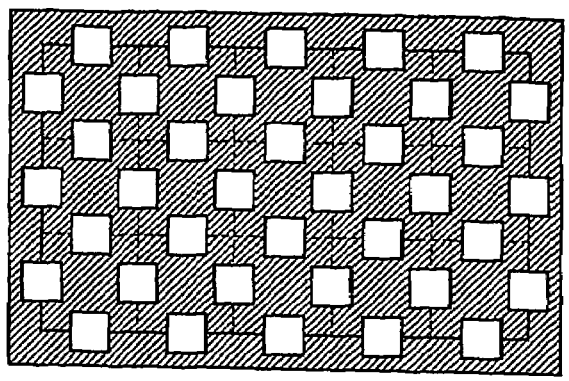
FIGS. 4A, 4B, 4C and 4D are schematic diagrams showing another example of a configuration of patterns of layers of Example 1.
Figure 4B:
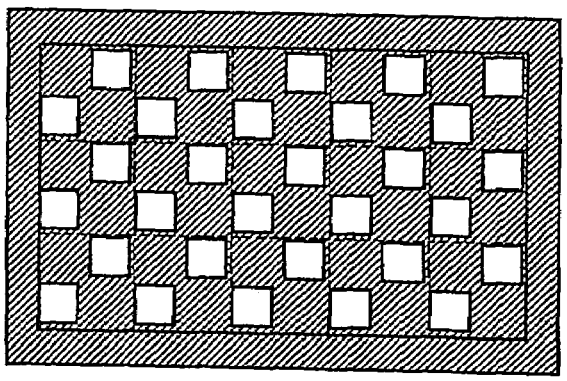
Figure 4C:
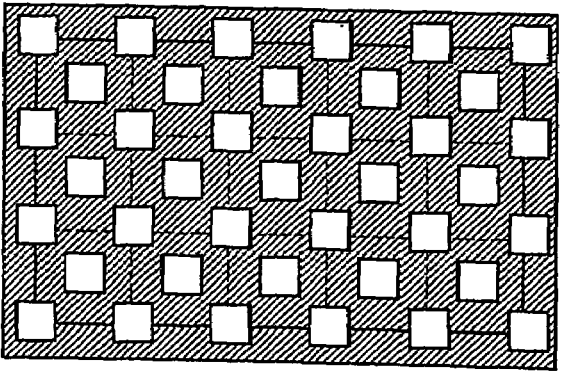
Figure 4D:
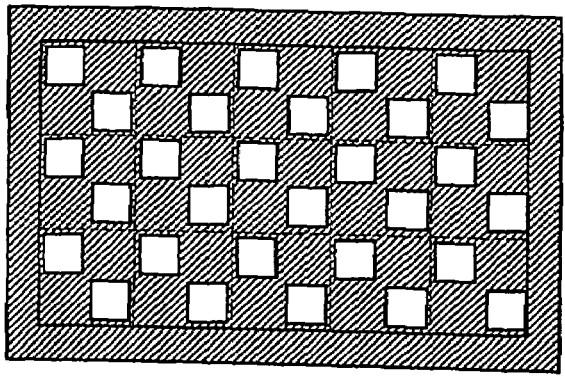

As the step for preparing the second member, which constitutes the first part of the second step of this Example, the same procedures as in the step for preparing the first member are carried out for the second substrate 1105 comprising Si to form a silicon layer 1111 comprising a porous layer 1106 and a microporous layer 1107. Next, as the second half of the second step, the microporous layer 1107 is subjected to patterning and the second patterned layer having the pattern of FIG. 2B is obtained. The obtained second patterned layer is the second device layer.

Next, as the first sub-step of the third step, the first device layer 1104, which is a microporous layer forming a pattern, and the second device layer 1107 are arranged facing each other and being jointed, as shown in FIG. 10C. For bonding, direct bonding described in Example 1 may be used.

The second sub-step of the third step is a separating step. As shown in FIG. 10D, one of the porous layers and the device layer, which are the porous layer 1106 and the microporous layer 1107 in this case, are separated so that the first and second device layers comprising the microporous layer are left on one of the substrates. The separation is conducted by the WJ as described in Example 1 toward the boundary between the two layers having different porous densities (shown by an arrow in FIG. 10C).

It is preferable to conduct the anodization under conditions that can make the separated surface as smooth as possible, for example, at a low temperature.

After the separation, the surface of the microporous layer 1107 can be smoothed by an annealing treatment.

According to these three steps, a structural body in which two patterned microporous layers 1104 and 1107 are jointed and laminated on the wafer via the porous layer 1102 can be obtained. From the fourth step onward, it is possible to increase the number of the microporous layers, i.e., the device layers to be laminated by repeating the second step and the third step, to obtain a number of layers optically necessary for a photonic crystal.

Figure 14:
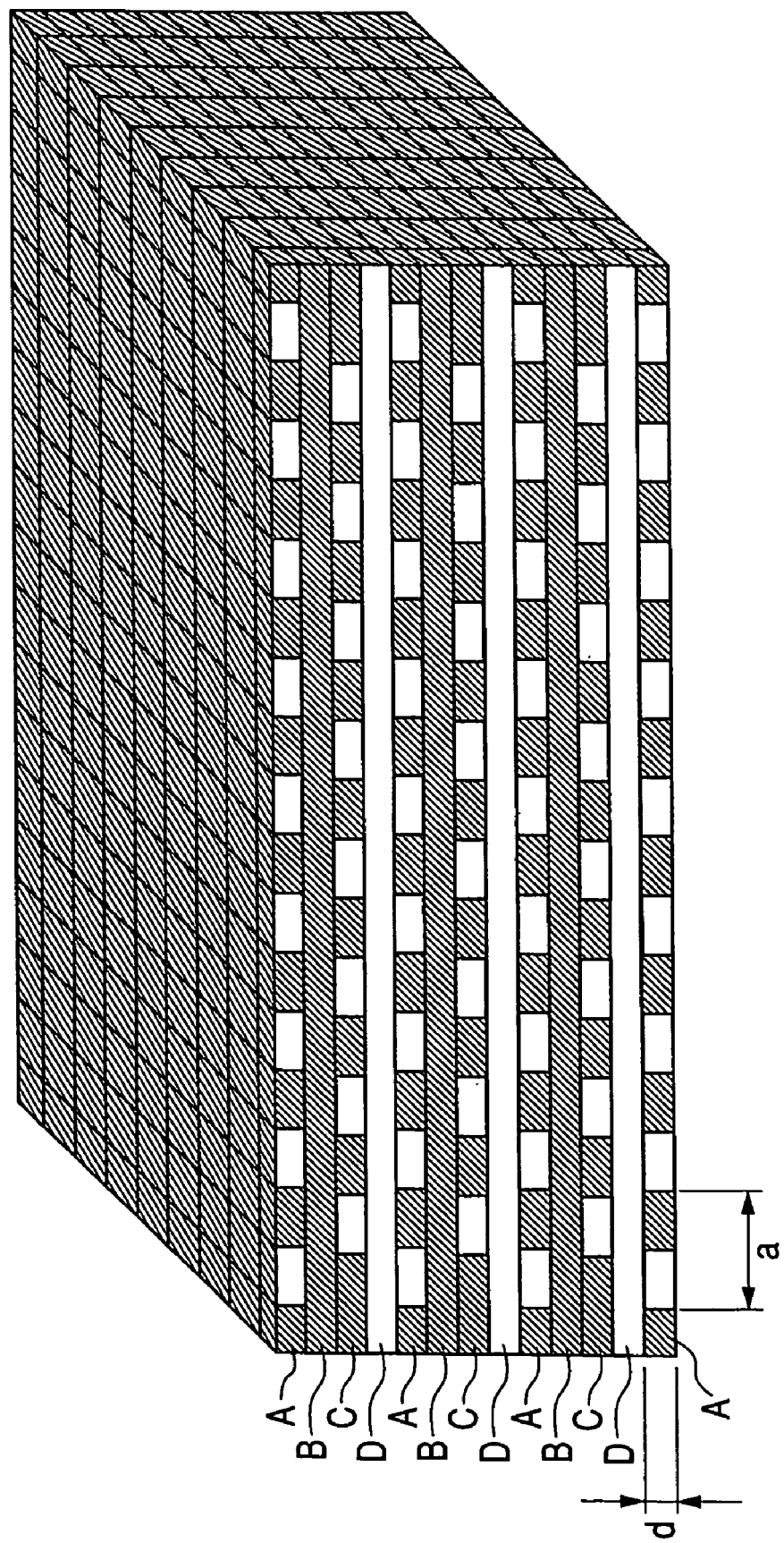
FIG. 14 is a schematic diagram showing one example of a configuration of large area three-dimensional photonic crystals of Example 3.

Through the above processes, a three-dimensional photonic crystal constituted by microporous-Si, as shown in FIG. 14, can be obtained. The thickness of each layer can be precisely adjusted to not more than 100 nm by controlling the voltage in the anodization. FIG. 14 illustrates a layer having a thickness of 70 nm and a period of the periodic refractive index distribution of 200 nm.

Since the photonic crystal of this Example uses microporous-Si as a material, it has a low absorption even in a visible light region. For the attenuation coefficient, absorption is lower than usual Si, on the order of about $10^4$. Thus, according to this Example, a high performance three-dimensional photonic crystal that has a small absorption, particularly in a visible light region, can be obtained.

In this Example, the step for making the upper surface of the Si substrate porous was set prior to the step for forming a pattern, but this can be done after the step for forming a pattern or after the bonding step, and the order can be selected depending on the conditions. It is also possible to change the order depending on the laminated portion.

Figure 12B:
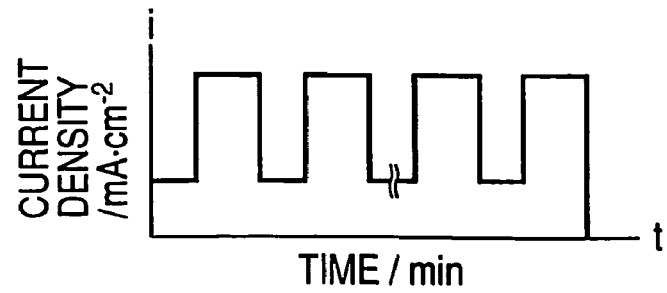
Figure 15C:
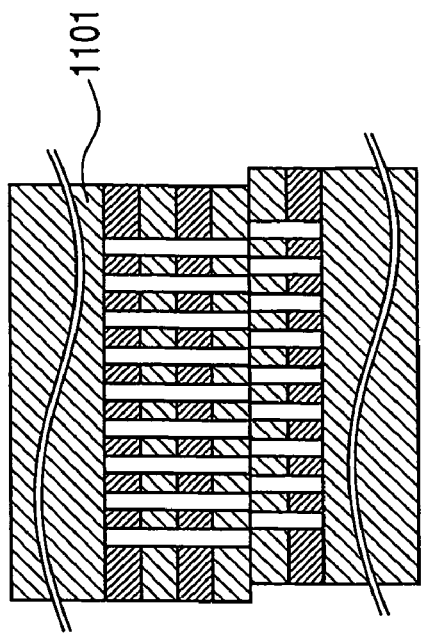
FIGS. 15A, 15B, 15C and 15D are schematic sectional views showing one example of a method for collectively fabricating multiple porous-Si layers.
Figure 15D:
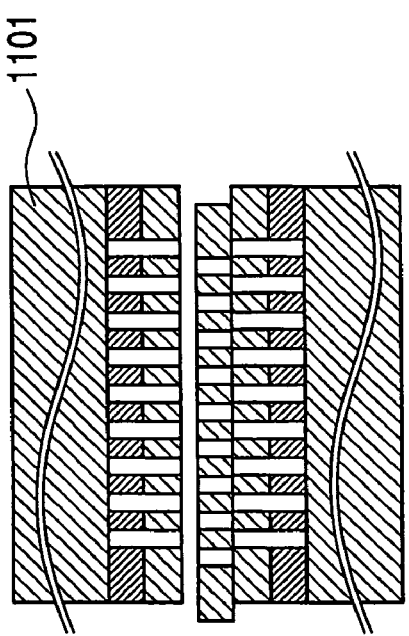
Figure 15A:
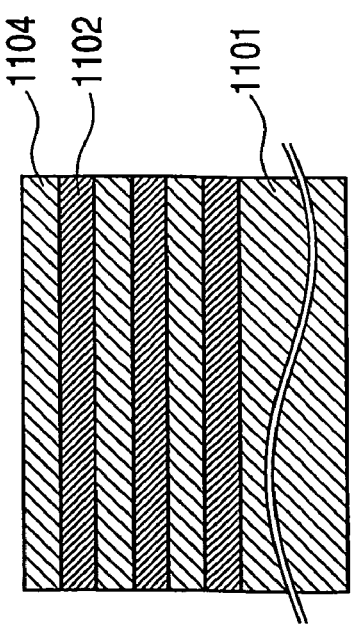
Figure 15B:
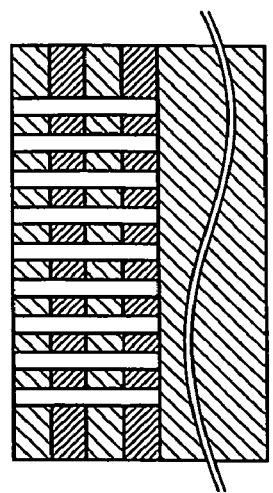

It is also possible to fabricate a three-dimensional photonic crystal by forming a microporous layer 1104, which is the device layer, and a ordinary porous layer 1102 alternately on the first substrate and by repeating the bonding step and the separating step using the second substrate as a seed substrate. This is achieved, for example, by the steps schematically described in FIGS. 15A to 15D. As shown in FIG. 15A, after forming a structure in which the microporous layer 1104 and the ordinary porous layer 1102 are alternately laminated by anodization by applying voltage periodically, as shown in FIG. 12B, patterning is conducted so as to perforate through the laminate structure, as shown in FIG. 15B. This structure is jointed on a wafer separately prepared, as shown in FIG. 15C, on which a porous layer may be formed as shown in the figure or which may be a simple substrate on which nothing is formed. Then, as shown in FIG. 15D, a structure is formed by repeating the steps of removing the ordinary porous layer by separating at the ordinary porous layer 1102 and jointing while shifting the microporous layers 1104 half a period. In this method, when the microporous layer 1104 is sufficiently thin and the position is properly adjusted upon shifting, the structure of FIGS. 8A and 8B can also be prepared.

Figure 16C:
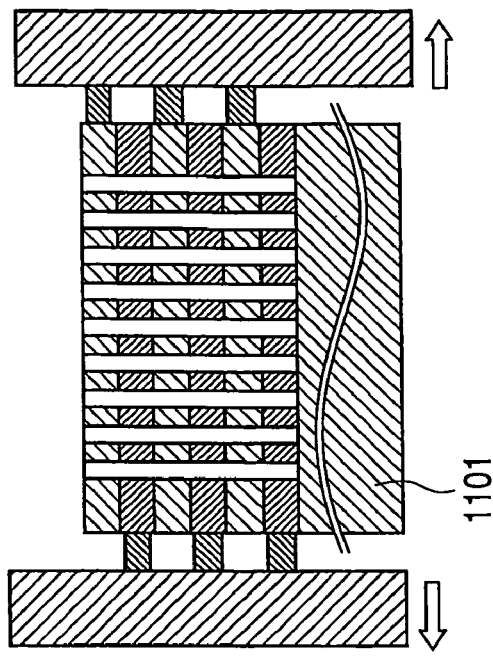
FIGS. 16A, 16B, 16C and 16D are schematic sectional views showing one example of a method for collective alignment of multiple microporous-Si layers.
Figure 16D:
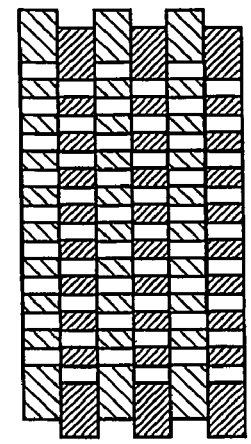
Figure 16A:
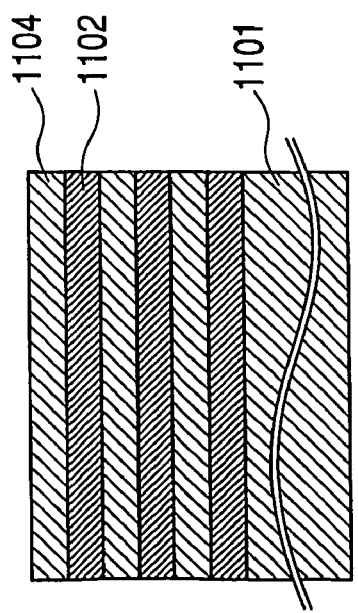
Figure 16B:
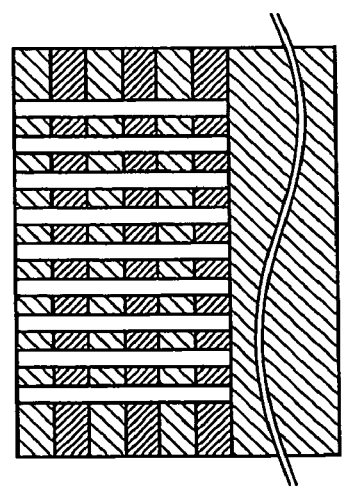

When fabricating the multilayer as mentioned above and the two porous layers are both microporous layers, the following is possible. That is, in the separation step of FIG. 16C after the perforation patterning of FIG. 16B, across-the-board, half-period shifting can be conducted between the two kinds of porous layers 1102 and 1104 by using a process for dragging the multi-layered porous layers 1102 and 1104 alternately in opposite directions from the both sides. Then, by jointing as it is as shown in FIG. 16D, a microporous-Si three-dimensional photonic crystal can be prepared.

In this Example, a material other than Si, such as GaP, AlP and AlAs, may be accordingly used in a combination with a seed substrate made of Si or Ge. In such case, after forming a porous layer on the upper surface of the seed substrate made of Si or Ge, an epitaxially grown layer of GaP, AlP or AlAs is formed and the epi-layer is made microporous to conduct patterning thereon. The subsequent steps can be carried out as described above.

EXAMPLE 4

The fourth Example of the present invention (PC laser) is as follows. This Example illustrates a case of fabricating a laser device using the three-dimensional photonic crystal prepared according to the method of the present invention.

Figure 17A:
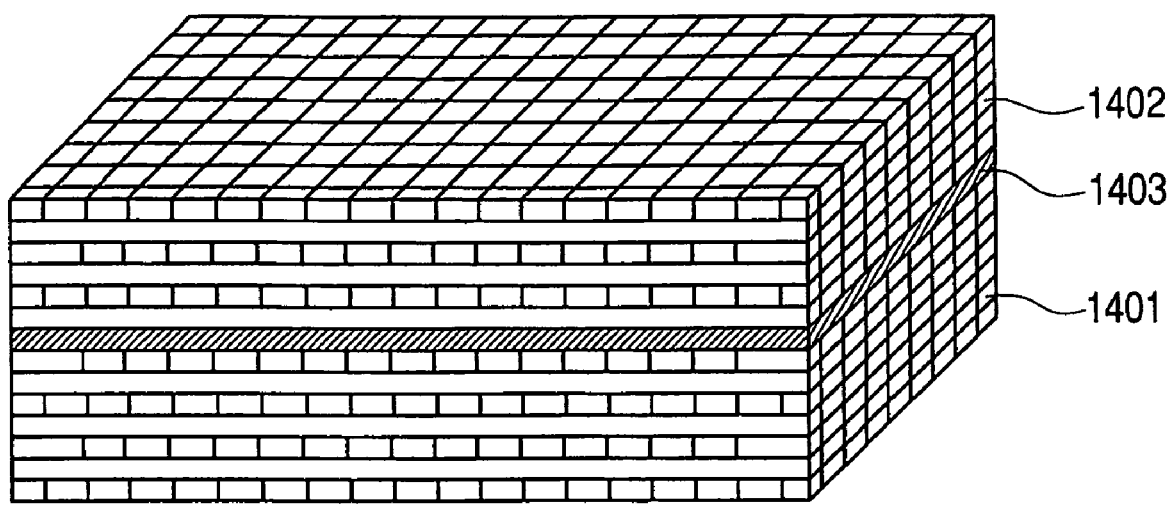
FIGS. 17A and 17B are schematic diagrams showing one example of a configuration of a photonic crystal laser of Example 4.

FIG. 17A is a schematic view showing a photonic crystal laser in which a laser medium layer 1403, which is to be a sheet-type emitting layer, is provided. In FIG. 17A, the laser medium layer 1403 is interposed between the lower three-dimensional photonic crystal 1401 and the upper three-dimensional photonic crystal 1402.

The method of making such arrangement involves two alternatives. That is, 1) a method of lamination from the lower photonic crystal according to the method described in the above-mentioned Example 1 and then laminating the laser medium layer 1403 as well; or 2) a method in which the upper and lower photonic crystals are prepared in advance according to the method of Example 1 and then fused with the laser medium layer 1403. In this case, patterning can be conducted on the laser medium layer 1403 itself to incorporate a periodic structure or a periodic structure with a defect structure easily.

Figure 17B:
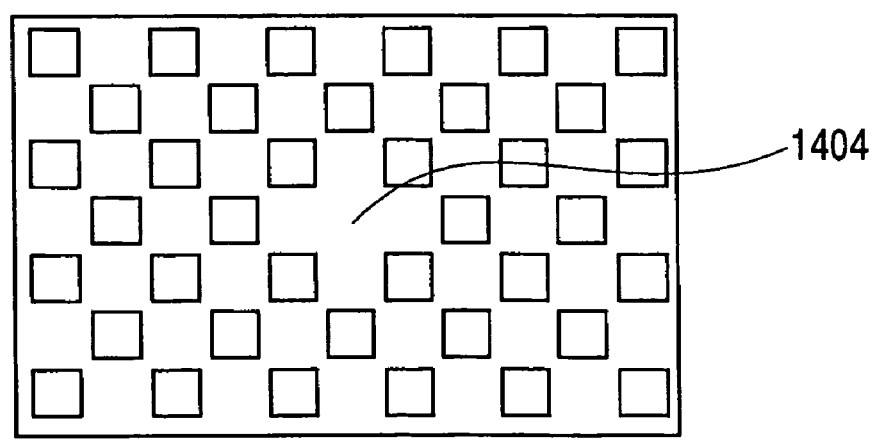

A wire for current injection or a system for optical excitation, which is not shown in the figure, is provided on the laser medium layer 1403. Based on the laser principle, laser oscillation occurs with the upper and lower photonic crystals 1401 and 1402 as a resonator, i.e., a narrowband element. For the mode of the laser oscillation, when the upper and lower photonic crystals 1401 and 1402 have a periodic structure in which no defect is incorporated, a DFB oscillation, i.e., a photonic band edge oscillation, is caused, where the mode has a relatively broad area, which covers a plurality of periods of the photonic crystal. In addition, defect 1404 may be introduced on the adjacent layer contacting the laser medium layer 1403 of the upper and lower photonic crystals 1401 and 1402, as shown in FIG. 17B. In this case, the laser resonator functions in a local mode, i.e., an oscillation mode corresponding to one period of the photonic crystal as a whole to emit light.

The laser medium layer 1403 may be comprised of an organic dye, such as coumarin, rhodamine, DCM and Alq3, or a host material containing a dye. In addition, a compound semiconductor containing a ternary or quaternary mixed crystal such as GaAs, InP, InGaN, InGaAs and InGaAlP, may be used depending on the purpose. The laser medium layer may have , for example, a multiple quantum well structure or a quantum dot structure.

Figure 18:
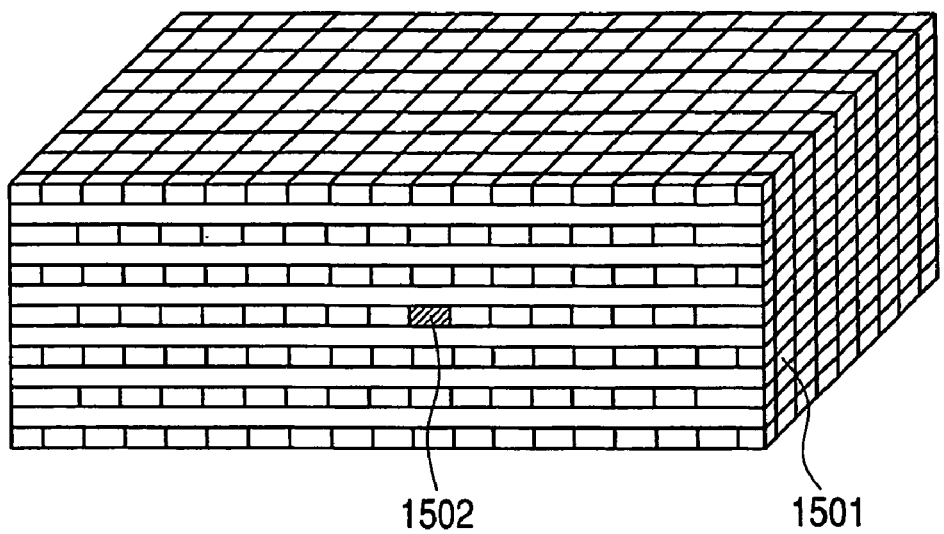
FIG. 18 is a schematic diagram showing another example of a configuration of the photonic crystal laser of Example 4.

On the other hand, as an excitation source, electron or hole transporting materials, such as Alq3 and TPD, current injection via an electrode, such as ITO and MgAg, and optical excitation using $N_2$ gas laser, Nd:YAG higher harmonic waves and blue/ultraviolet semiconductor laser, which are widely used in organo-electroluminescence devices, can be accordingly used. In addition, in this Example, laser medium 1502 may be provided in the form of a dot within the three-dimensional photonic crystal 1501, as shown in FIG. 18, or may form a point defect resonator. FIG. 18 is a schematic view illustrating a cross-section in an in-plane direction at the position where the laser medium 1502 is located.

As described above, a three-dimensional photonic crystal laser using the device layer relocation technique of the present invention has been achieved. By using a reduced loss high performance three-dimensional photonic crystal resonator of the present invention, a light-emitting element capable of oscillating at a wavelength that has previously resulted in a large loss (e.g., green light which has been difficult in a dye laser) or in a micro mode can be achieved.

EXAMPLE 5

The fifth Example of the present invention is as follows. This Example illustrates a case of fabricating a color display using a photonic crystal light-emitting element prepared according to the method of the above-mentioned Example 4.

Figure 19:
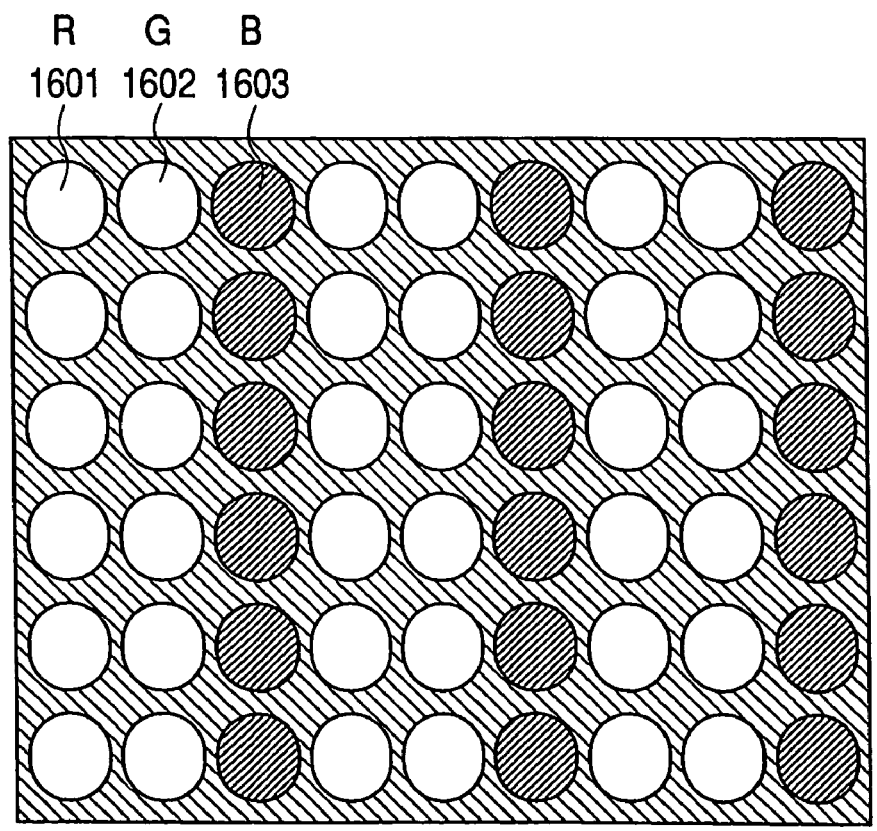
FIG. 19 is a schematic plan view showing one example of a configuration of a display using photonic crystals of Example 5.

FIG. 19 is a schematic view of a part of the display of this Example taken from the direction vertical to the display surface. The display comprises light-emitting pixels of three primary colors of Red (R) 1601, Green (G) 1602 and blue (B) 1603, which are integrated in an array.

Figure 20:
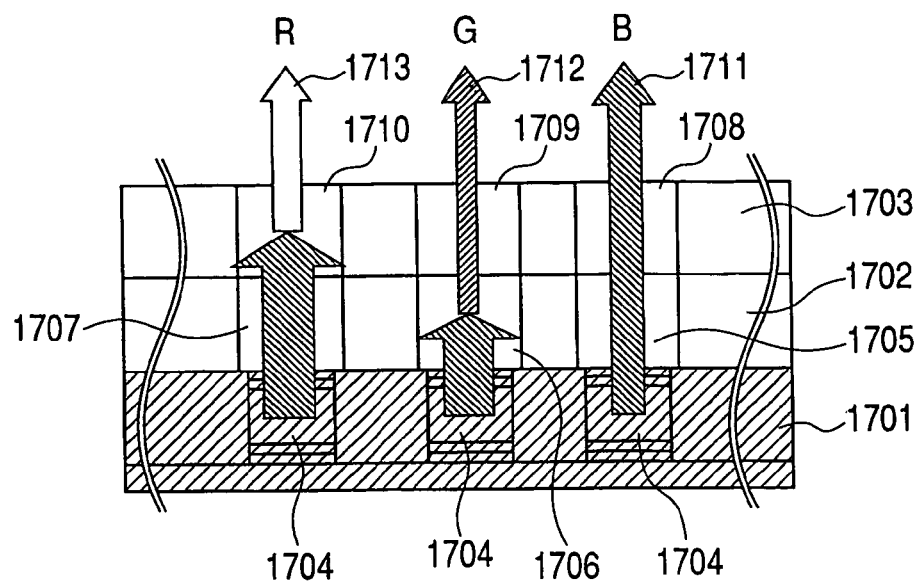
FIG. 20 is a schematic sectional view showing one example of a configuration of a display using photonic crystals of Example 5.

FIG. 20 is a schematic view illustrating a cross-sectional structure of the part corresponding to a pair of the pixels of the three primary colors. In the structure of FIG. 20, a blue photonic crystal layer 1701, a green photonic crystal layer 1702 and a red photonic crystal layer 1703 are formed from the bottom in the lamination direction.

As described in Examples 1 to 3, since any pattern can be formed in the layer and the thickness of the layer is variable in the present invention, the structure of FIG. 20 can be fabricated by setting the pattern and the thickness in three ways and forming the layers sequentially.

Each photonic crystal layer has a photonic band gap for the wavelength of the color, and therefore, serves as a photonic crystal laser of that color. In the blue photonic crystal layer 1701, blue light is in the photonic band gap.

Figure 21A:
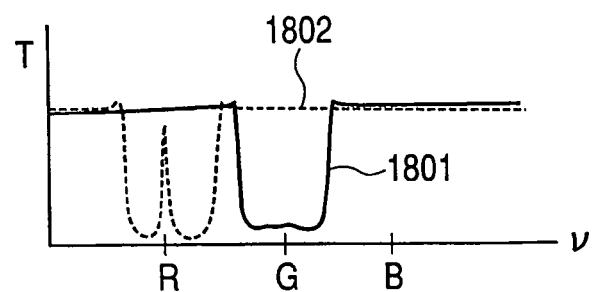
FIGS. 21A, 21B and 21C are graphs showing transmittance characteristics of two types of photonic crystals constituting a display using photonic crystals of Example 5.
Figure 21B:
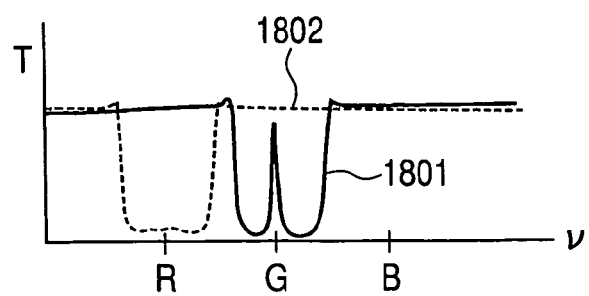
Figure 21C:
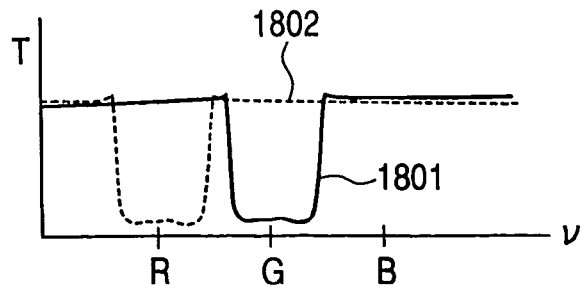

FIGS. 21A to 21C show the transmittance of the green photonic crystal layer 1702 and the red photonic crystal layer 1703 at (a) R pixel position, (b) G pixel position and (c) B pixel position. In each graph, the solid line plot 1801 indicates the wavelength-based characteristic of the transmittance of the green photonic crystal layer 1702 and the broken line plot 1802 indicates the wavelength-based characteristic of the transmittance of the red photonic crystal layer 1703.

In the green photonic crystal layer 1702, green light is within the photonic band gap, and an arrangement is made so that the blue light is outside the band gap. Therefore, the blue light is transmitted. In the red photonic crystal layer 1703, red light is within the photonic band gap, and an arrangement is made so that blue and green lights are outside the band gap. Therefore, the blue and green lights are transmitted.

In the structure of FIG. 20, the blue photonic crystal layer 1701, which is the lowest layer, is prepared according to the method described in Example 1. The layer may be prepared by the method described in Example 2 or 3. Since the blue laser is used as excitation light for red and green lasers in this Example, the blue photonic crystal layer 1701 has three blue lasers 1704 in the in-plane direction so as to make ON/OFF switching independently by wires, which are not shown in the figure.

The green photonic crystal layer 1702 is formed on the blue photonic layer 1701 as a three-dimensional photonic crystal in which the pitch of the layer pattern and the layer thickness are different from those of the blue photonic crystal layer and arranged to have a photonic band gap in the wavelength range of green.

The output light from the blue laser 1704 is introduced to the positions 1705, 1706 and 1707 in the in-plane direction of the green photonic crystal layer 1702. Of these, the position 1706 constitutes a green photonic crystal laser part. That is, the three-dimensional photonic crystal laser fabricated according to the method of Example 4 is provided with the oscillation wavelength being set to the wavelength of green light. Excitation means in this Example is light irradiated from the blue laser 1704. Therefore, by the ON/OFF switching of the blue laser, the output of the green laser can be switched ON and OFF.

Since the green photonic crystal 1702 is designed to have a band gap only in the wavelength range of green light, the output from the blue laser 1704 is transmitted at a high transmittance at the part 1705 corresponding to the blue (B) pixel and the part 1707 corresponding to the red (R) pixel.

Next, as in the case of the green photonic crystal layer 1702, the red photonic crystal layer 1703 is made of the three-dimensional photonic crystal of the present invention, and a red photonic crystal laser 1710 is formed only on the red pixel portion in the in-plain direction. The red photonic crystal laser 1710 is excited by the blue laser beam transmitted through the green photonic crystal 1707 to output red laser. The other parts, i.e., the red photonic crystal 1709 on the green pixel part and the red photonic crystal 1708 on the blue pixel part, transmit green light and blue light, respectively, at a high transmittance, as shown in the broken line plots 1802 in FIGS. 21A to 21C. At this stage, the output lights from the two blue lasers 1704 used as the excitation light for the green photonic crystal laser part 1706 and the red photonic crystal laser part 1710 are set to be higher in the intensity than that of the output light from the blue laser 1704, which is transmitted and utilized as it is, as represented by the width of the arrows in FIG. 20.

In this way, R (red light emission) 1713, G (green light emission) 1712 and output light B (blue light emission) 1711 corresponding to each pixel of R, G and B are obtained. These are mixed to form the pixel of a color display and by integrating these in the in-plane direction, a display having a large number of pixels, as shown in FIG. 19, can be fabricated.

The output mode of the laser, i.e., light distribution (direction-dependent light intensity distribution) in each of the photonic crystal laser parts 1704, 1706 and 1710, can be adjusted by setting the photonic crystal as a resonator. In addition, by setting a refractive index distribution of the photonic crystal on the parts 1705, 1707, 1708 and 1709, which are used as transmission parts in the photonic crystal, some factors of an optical element, such as focusing of light and collimation, can be imparted as a passive transmission element.

Figure 22:
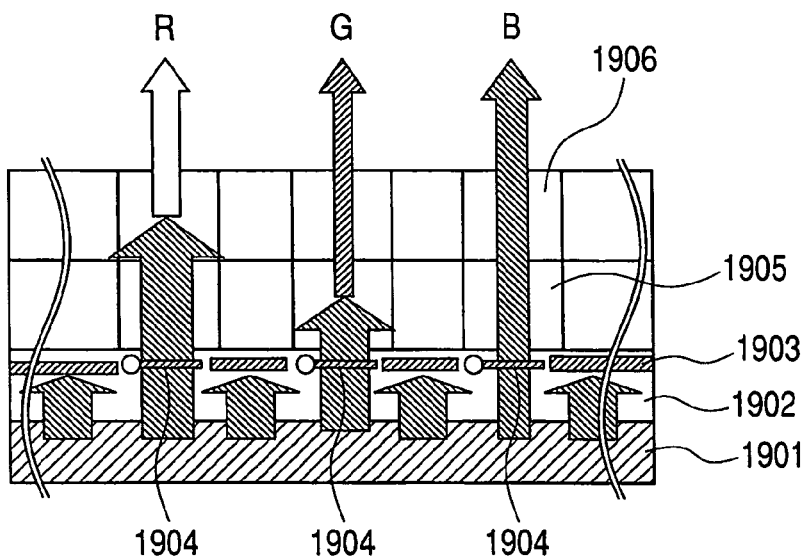
FIG. 22 is a schematic sectional view showing another example of a configuration of the display using photonic crystals of Example 5.

As the excitation means for R, G and B, the structure as shown in FIG. 22 may be employed. That is, in FIG. 22, a blue light source 1901 is a light source, which illuminates the area covering a plurality of pixels on which an optical shutter layer 1902 is formed. The optical shutter layer 1902 has a shutter 1903, which blocks the blue light from the blue light source 1901, and a variable shutter 1904. The variable shutter 1904 is designed to switch the transmittance of the blue light per pixel R, G and B independently. A device similar to that of FIG. 20 is formed on the upper layer of the optical shutter layer 1902. In this construction, it is essential that the B pixel parts 1905 and 1906 of the green photonic crystal layer and the red photonic crystal layer are designed so as to make the light distribution of the blue light comparable to the display output. The same applies to the G pixel part of the red photonic crystal layer. As the variable shutter 1904, various shutters including a movable shutter using microelectromechanics (MEMS) and a variable optical shutter, such as a liquid crystal, can be used.

Additionally, in this Example, the outputs from the light source at the lowest layer and the excitation source are varied for RGB (represented by the width of the arrows in the figure as mentioned above), or the transmittance can be adjusted at the transmitted photonic crystal part in consideration of the balance of the amount of RGB light and the laser efficiency. The alignment of pixels 1601, 1602 and 1603 shown in FIG. 19 can be optionally changed.

EXAMPLE 6

The sixth Example of the present invention is as follows. This Example illustrates an application of the three-dimensional photonic crystal of the present invention to an optical wire or an optical circuit by introducing thereto a three-dimensional waveguide defect. Here, a defect waveguide in the lamination direction is also used in a combination, in addition to the widely known in-plane defect waveguides.

Figure 23A:
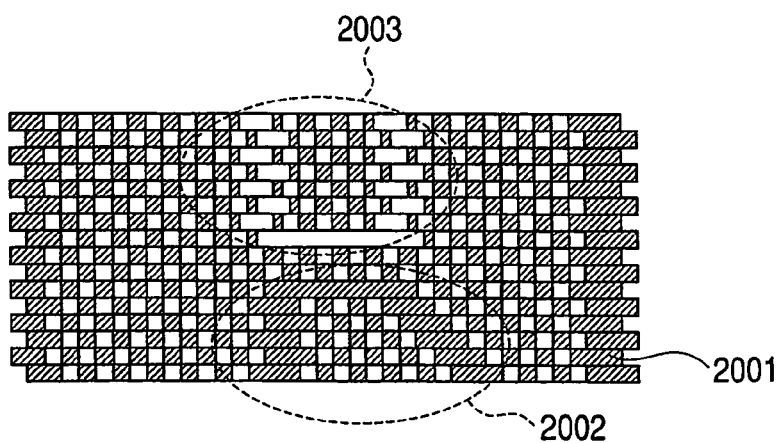
FIGS. 23A and 23B are schematic diagrams showing an example of a defective waveguide in three-dimensional photonic crystals of Example 6.
Figure 23B:
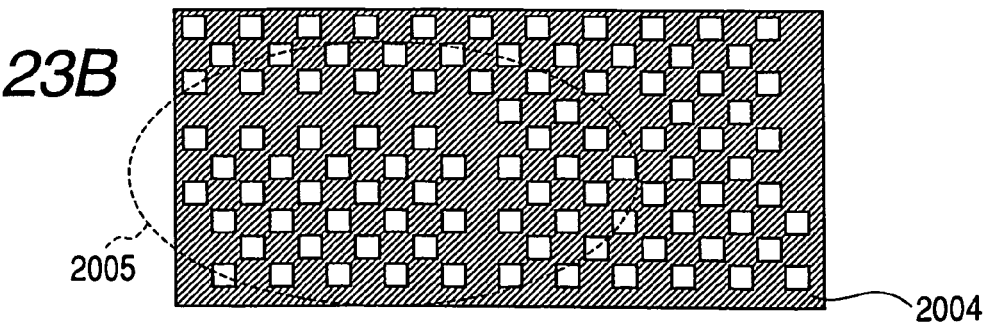

FIGS. 23A and 23B are schematic views illustrating a case of creating a three-dimensional defect waveguide of this Example. FIG. 23A shows a case of a defect waveguide, which is a component thereof in the lamination direction, and FIG. 23B shows a schematic view of an in-plane defect waveguide, which is another component.

In FIG. 23A, reference numeral 2001 is the three-dimensional photonic crystal fabricated according to the method of the present invention, and a schematic cross-section thereof in the lamination direction is shown. Two defect waveguides in the lamination direction are formed at the center of the cross-section, and the defect waveguide 2003 in the lamination direction is formed by widening the pore size of the periodic pore at a specified portion in each layer, while the defect waveguide 2002 in the lamination direction is formed by closing the periodic pore at a specified portion in each layer.

In the waveguide 2003 of this Example, since the same periodic pattern is formed on each layer and the widening of the pore size is also conducted on the same portion, as shown in FIG. 23A, and the photonic crystal is formed according to the method of shifting each layer having the same pattern half a period, the cost for forming the waveguide pattern in accordance with this Example is relatively low.

In this way, as in the case of FIG. 23A, introduction of the defect waveguide in the lamination direction is easy in the three-dimensional photonic crystal of this Example. By a suitable combination of, for example, coupling with a defect waveguide 2005 in the plane 2004 direction of a general photonic crystal, as shown in FIG. 23B, a three-dimensional waveguide network can be created in the three-dimensional photonic crystal with a high degree of flexibility.

While FIG. 23A illustrates the case in which the defect waveguide in the lamination direction is formed in parallel with the lamination direction, a three-dimensionally oblique waveguide, i.e., a waveguide extending to both the lamination direction and the in-plane direction, can also be formed by shifting the in-plane position little by little between the layers.

In addition, according to the method of the present invention, since an epitaxially grown layer can be used for each layer of the photonic crystal, the thickness can be set on the order of 10 nm, which is extremely thin, as described above. In that case, the layer thickness can be smaller than the periodic length required for a photonic crystal. Therefore, one period may be comprised of a plurality of layer thicknesses (see explanation of FIGS. 8A and 8B above). Accordingly, the defect waveguide in the lamination direction that is as fine as not more than one period can also be arranged, achieving most appropriate defect waveguide structure.

Figure 24A:
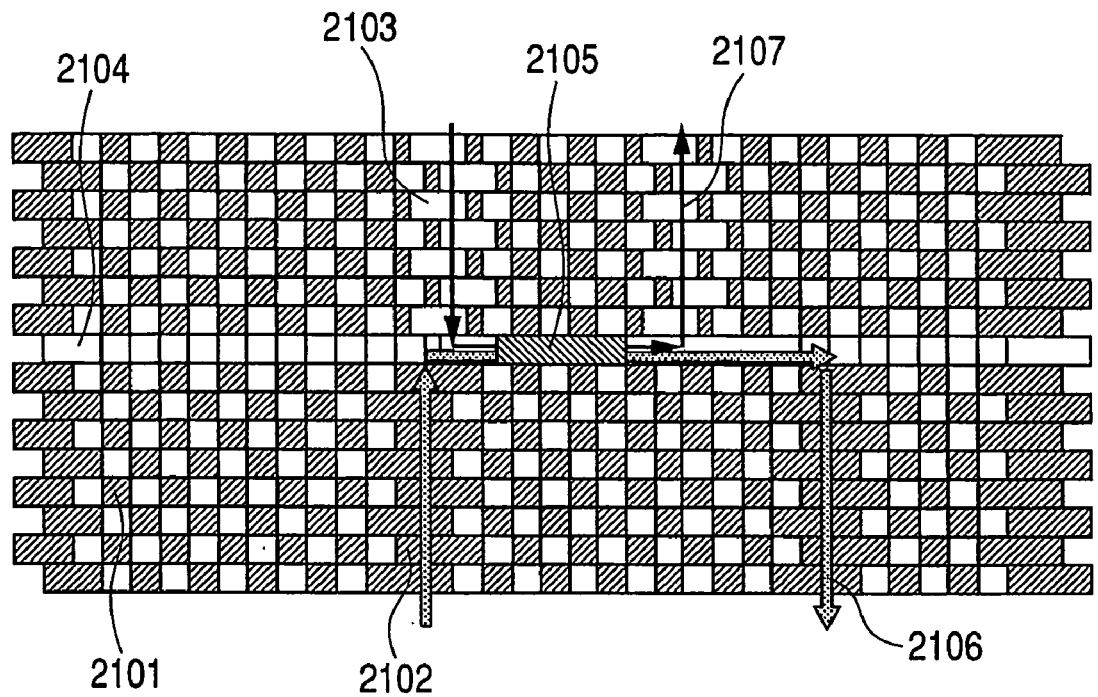
FIGS. 24A and 24B are schematic diagrams showing one example of a configuration of a three-dimensional optical circuit using photonic crystals of Example 6.
Figure 24B:
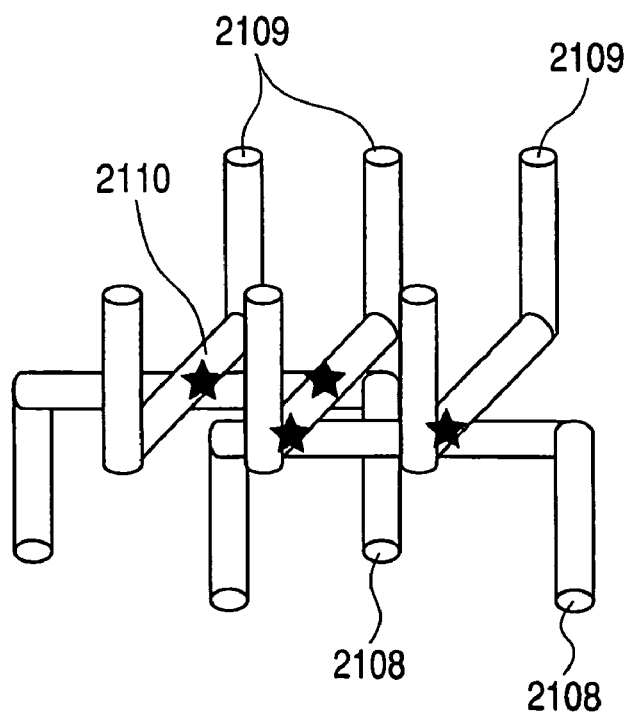

Next, in FIGS. 24A and 24B, a case of an optical circuit using the above-mentioned three-dimensional waveguide is shown. FIG. 24A is a schematic view showing a case of fabricating an optical-optical switch circuit comprising two three-dimensional waveguides and a three-dimensional optical non-linear material introduced at the intersection thereof. In FIG. 24A, two three-dimensional waveguides 2102 and 2103 are formed inside the three-dimensional photonic crystal 2101. The layer 2104 at the intersection thereof is different from other layers, and a three-dimensional optical non-linear material 2105 is introduced at the intersection. Since the three-dimensional optical non-linear material 2105 has a so-called cross-phase modulation effect, the phase of the light 2107 passing through the other light waveguide 2103 is modulated in proportion to the intensity of light 2106 incident upon the non-linear material through the light waveguide 2102.

Accordingly, by converting the phase of light passing through the light waveguide 2103 to an intensity signal by using a phase detector, such as a Mach-Zehnder interferometer, which is not shown in the FIG., switching of the intensity occurs dependent on the light waveguide 2102.

FIG. 24B is a schematic view illustrating a three-dimensional combination of a plurality of such waveguides, describing only the position of the waveguides. Three waveguides 2109 intersect with two waveguides 2108 via the optical non-linear material 2110 at the intersection, and by the intensity of light passing through these waveguides switching occurs mutually. A more complicated light circuit network is formed by combining such circuit.

As the three-dimensional optical non-linear material, various materials may be used, including a semiconductor exciton or a material using a low dimensional effect thereof, such as a quantum dot and a quantum well, a material using fine metal particles and oxide crystals, such as $LiNbO_3$ and $TiBaO_3$.

In addition, since the element comprises a photonic crystal in this Example, the effects (low group velocity light, resonator QED etc.) can be utilized by forming a photonic crystal structure, which reduces the group velocity of the guided light or a small photonic crystal resonator near the position where a non-linear material is incorporated. In this way, various characteristics of the photonic crystal, such as enhanced switching effect due to the increased non-linear mutual operation time, can be easily utilized.

EXAMPLE 7

Figures 25A, 25B:
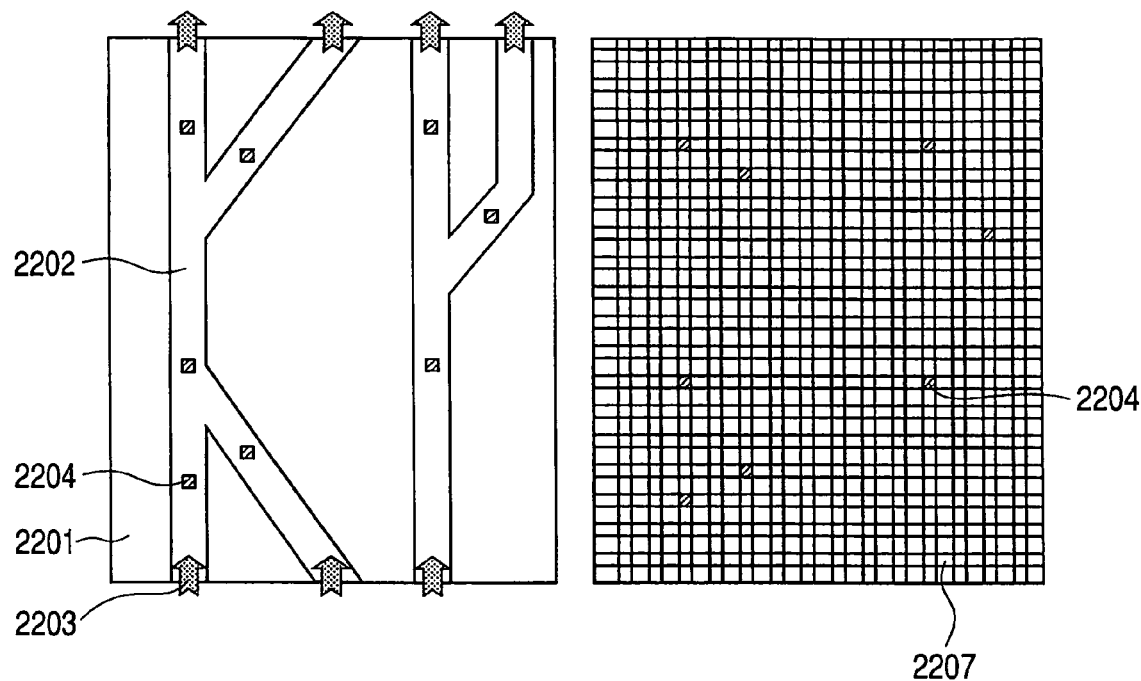
FIGS. 25A, 25B and 25C are schematic diagrams showing one example of μTAS using photonic crystals of Example 7.
Figure 25C:
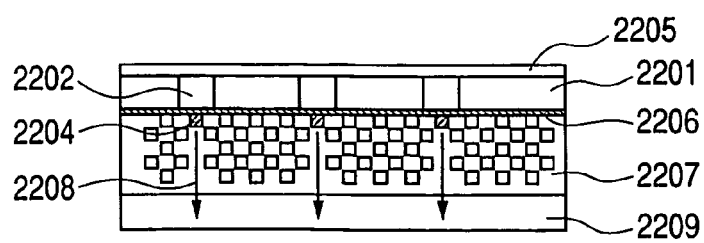

The seventh Example of the present invention is as follows. FIGS. 25A to 25C are schematic views illustrating an embodiment of a μTAS (micro-total analysis system) sensor system using the three-dimensional photonic crystal 2207 of the present invention.

FIG. 25A is a schematic overhead image of the position of the μTAS channels and the photonic crystal laser. Channel 2202 is formed on a channel substrate 2201, in which a fluid 2203 containing detected information flows. The structure of the channel 2202 may be mixing, reaction and other various structures used in μTAS in addition to branch and convergence shown in the figure. A photonic crystal laser sensor 2204 is provided beneath the channel 2202 as represented in a perspective manner. FIG. 25B illustrates a laser sensor 2204 formed on the upper surface of the three-dimensional photonic crystal layer 2207.

The photonic crystal laser sensor 2204 has a laser oscillation, which varies in an extremely sensitive way due to the concentration of the substance contained in the fluid flowing through the channel 2202, the refractive index, the temperature and the pressure of the fluid. The characteristic thereof is to detect the oscillation of the laser according to the output of the laser beam. Accordingly, in this Example, as shown in FIG. 25C, the output of the laser beam 2208 is detected by a light-receiving layer 2209, which is the lowest layer, and the oscillation of each laser sensor 2204 is detected.

The oscillation of the laser sensor can be detected by a method other than detecting the output of the laser beam. In the case of exciting the laser by injection of current, the oscillation of the laser can be also monitored by the variation of the injected current.

FIG. 25C is a schematic cross-section of the sensor system of this Example. Channel 2202 is formed on a channel layer 2201 as described above, and a cover layer 2205 is formed thereon to close the channel 2202 in the lamination direction. The other lamination direction is closed by a thin film 2206, where a photonic crystal laser 2204 is formed in contact with the thin film 2206. The thickness of the thin film 2206 is set to be the optimal value to the level of the oscillation wavelength of the photonic crystal laser. The optimal value is determined so that the evanescent light from the resonator of the photonic crystal laser senses the variation in channel 2202 and fluid 2203 and so that the fluctuation of the threshold due to the loss in the laser resonator is near the condition that enables oscillation.

When the thin film layer 2206 above the photonic crystal part is formed by epitaxial growth, a high performance element with excellent surface smoothness and low light scattering loss can be fabricated according to the same technique as used in the method of fabricating the three-dimensional photonic crystal of the present invention.

As described above, a μTAS sensor system can be formed by using the three-dimensional photonic crystal and the method of fabricating the same in accordance with the present invention. According to this Example, such a μTAS system can be formed in a large area, and a large number of devices can be obtained from a wafer having a large area. As a result, there is an advantage in that the fabrication can be conducted at a relatively low cost. In the case of forming a μTAS system using silicon or $SiO_2$, integrated formation is possible. Even in the case where each part is separately formed and jointed, the compatibility of the materials is extremely high.

EXAMPLE 8

The present invention is not limited to the Examples described above and the flow of the sequence and other factors can be modified accordingly within the spirit of the present invention.

In particular, the present invention is not limited to materials such as Si, GaAs, Ge and GaP and can be similarly carried out in a combination of a III-V compound semiconductor, such as AlGaAs, InGaAs, InAs, GaInNAs, InGaP and InP, a II-VI compound semiconductor, such as CdSe and CdS, and an epitaxially grown material that has a similar lattice constant and linear expansion coefficient with a seed substrate material.

The principle of the present invention is widely applicable and not limited to those having an almost periodic refractive index distribution pattern, but can be applied to the fabrication of an optical element for three-dimensional structural body having a non-periodic or random refractive index distribution pattern. In addition, the formation of the refractive index distribution pattern can be carried out after jointing the layers, and the refractive index distribution pattern can also be formed even in the embodiments in which the refractive index continuously changes as in the case of conducting etching on a crystal layer with constant change in the etching depth or the case of applying doping, such as ion injection, in which the concentration of impurities changes continuously, in addition to the embodiment of forming space or the embodiment involving a non-continuous and relatively sharp change, as described in the above Examples.

This application claims priority from Japanese Patent Application Nos. 2003-377638, filed Nov. 7, 2003, and 2004-317579, filed Nov. 1, 2004, which are hereby incorporated by reference herein.

The invention claimed is:

1. A method for production of an optical element comprising the steps of:
   (a) forming alternatingly porous layers and microporous layers on a first substrate;
   (b) forming a refraction index distribution pattern on the microporous layers collectively;
   (c) bonding a second substrate to the porous layer or microporous layer being the outermost layer;
   (d) separating a pair of microporous layers spaced by the porous layer at the porous layer;

(e) shifting the separated microporous layers from each other along an in-plane direction, and bonding the shifted microporous layers to each other; and (f) repeating said steps (d) and (e) for each porous layer.

2. A method for production of an optical element comprising the steps of:

(a) forming alternatingly porous layers and microporous layers on a first substrate;

(b) forming a refraction index distribution pattern on the microporous layers collectively;

(c) bonding a second substrate to the microporous layer being the outermost layer;

(d) removing the porous layer adjacent to the microporous layer bonded to the second substrate; and (e) shifting the microporous layer exposed at a first substrate end by removing of the porous layer from the microporous layer transfeffed on the second substrate along an in-plane direction, and bonding the microporous layers to each other.

* * * * *

UNITED STATES PATENT AND TRADEMARK OFFICE
CERTIFICATE OF CORRECTION

| | |
|---|---|
| PATENT NO. | : 7,272,290 B2 |
| APPLICATION NO. | : 10/571696 |
| DATED | : September 18, 2007 |
| INVENTOR(S) | : Mitsuro Sugita et al. |

It is certified that error appears in the above-identified patent and that said Letters Patent is hereby corrected as shown below:

ON THE TITLE PAGE [56] REFERENCES CITED:

Other Publications, "S. Kawatami," should read --S. Kawakami,--.

COLUMN 5:

Line 46, "an" should read --as--.

COLUMN 6:

Line 36, "preferred" should read --the preferred--.

COLUMN 16:

Line 1, "a" should read --an--.

COLUMN 17:

Line 20, "have ," should read --have,--.

COLUMN 21:

Line 52, "be also" should read --also be--.

UNITED STATES PATENT AND TRADEMARK OFFICE
CERTIFICATE OF CORRECTION

PATENT NO. : 7,272,290 B2
APPLICATION NO. : 10/571696
DATED : September 18, 2007
INVENTOR(S) : Mitsuro Sugita et al.

It is certified that error appears in the above-identified patent and that said Letters Patent is hereby corrected as shown below:

COLUMN 24:

Line 7, "transfeffed" should read --transferred--.

Signed and Sealed this

Sixth Day of May, 2008

JON W. DUDAS
*Director of the United States Patent and Trademark Office*